(12) United States Patent
Liu et al.

(10) Patent No.: US 11,461,639 B2
(45) Date of Patent: Oct. 4, 2022

(54) IMAGE PROCESSING METHOD, IMAGE PROCESSING DEVICE, AND TRAINING METHOD OF NEURAL NETWORK

(71) Applicant: BOE TECHNOLOGY GROUP CO., LTD., Beijing (CN)

(72) Inventors: Hanwen Liu, Beijing (CN); Pablo Navarrete Michelini, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 861 days.

(21) Appl. No.: 16/336,995

(22) PCT Filed: Aug. 16, 2018

(86) PCT No.: PCT/CN2018/100833
§ 371 (c)(1),
(2) Date: Mar. 27, 2019

(87) PCT Pub. No.: WO2019/042139
PCT Pub. Date: Mar. 7, 2019

(65) Prior Publication Data
US 2019/0220746 A1 Jul. 18, 2019

(30) Foreign Application Priority Data
Aug. 29, 2017 (CN) .......................... 201710757133.7

(51) Int. Cl.
*G06V 10/00* (2022.01)
*G06N 3/08* (2006.01)
(Continued)

(52) U.S. Cl.
CPC ................ *G06N 3/08* (2013.01); *G06K 9/62* (2013.01); *G06N 3/04* (2013.01); *G06N 3/0472* (2013.01); *G06T 3/0012* (2013.01); *G06T 11/00* (2013.01)

(58) Field of Classification Search
CPC .. G06V 10/766; G06V 10/774; G06V 30/191; G06V 30/19147; G06K 9/62;
(Continued)

(56) References Cited

U.S. PATENT DOCUMENTS 10,482,565 B1 * 11/2019 Chen ..................... G06N 3/0454
10,685,057 B1 * 6/2020 Chavez ............... G06F 16/9535
(Continued)

OTHER PUBLICATIONS

Johnson et al. "Perceptual Losses for Real-Time Style Transfer and Super-Resolution." https://arxiv.org/abs/1603.08155. V1. Mar. 27, 2016. 18 pages.
(Continued)

*Primary Examiner* — Amir Alavi
(74) *Attorney, Agent, or Firm* — Leason Ellis LLP

(57) ABSTRACT

A training method of a neural network for implementing image style transfer, an image processing method and an image processing device are disclosed. The training method includes: acquiring a first training input image and a second training input image; performing a style transfer process on the first training input image by the neural network to obtain a training output image; based on the first training input image, the second training input image and the training output image, calculating a loss value of parameters of the neural network through a loss function; and modifying the parameters of the neural network according to the loss value, where the loss function satisfies a predetermined condition, obtaining a trained neural network, where the loss function doesn't satisfy the predetermined condition, continuing to repeatedly perform above training process, the loss function including a weight-bias-ratio loss function.

20 Claims, 16 Drawing Sheets

(51) Int. Cl.
  *G06T 3/00* (2006.01)
  *G06N 3/04* (2006.01)
  *G06T 11/00* (2006.01)
  *G06K 9/62* (2022.01)

(58) Field of Classification Search
  CPC ............ G06N 3/02; G06N 3/08; G06N 3/082;
    G06N 3/084; G06N 3/088; G06N 3/0454;
    G06N 3/049; G06N 3/0472; G06N 20/00;
    G06N 7/046; G06T 9/002; G06T 3/4046;
    G06T 3/0012; G06T 2207/20081; G06T
    2207/20084
  See application file for complete search history.

(56) References Cited

U.S. PATENT DOCUMENTS

| | | | |
|---|---|---|---|
| 2018/0068463 A1* | 3/2018 | Risser | G06T 7/45 |
| 2018/0204121 A1* | 7/2018 | Wang | G06N 3/0454 |
| 2018/0268284 A1* | 9/2018 | Ren | G06N 3/082 |
| 2018/0357800 A1* | 12/2018 | Oxholm | G06T 11/001 |
| 2018/0373999 A1* | 12/2018 | Xu | G06N 3/08 |
| 2019/0220746 A1* | 7/2019 | Liu | G06K 9/62 |
| 2019/0244060 A1* | 8/2019 | Dundar | G06T 15/00 |
| 2019/0259134 A1* | 8/2019 | Rainy | G06N 3/0454 |
| 2020/0151938 A1* | 5/2020 | Shechtman | G06N 3/0454 |
| 2020/0219274 A1* | 7/2020 | Afridi | G06T 7/45 |

OTHER PUBLICATIONS

Gatys et al. "A Neural Algorithm of Artistic Style." arXiv preprint arXiv: 1508.06576 (2015). 16 pages.

\* cited by examiner

IMAGE PROCESSING METHOD, IMAGE PROCESSING DEVICE, AND TRAINING METHOD OF NEURAL NETWORK

CROSS-REFERENCE TO RELATED APPLICATION

This application is a U.S. National Stage Application under 35 U.S.C. § 371 of International Patent Application No. PCT/CN2018/100833, filed Aug. 16, 2018, which claims the benefit of priority of Chinese Patent Application No. 201770757133.7, filed on Aug. 29, 2017, of which are incorporated by reference in their entireties as part of the present application.

TECHNICAL FIELD

The embodiments of the present disclosure relate to a training method of a neural network for implementing image style transfer, an image processing method for implementing image style transfer based on a neural network and an image processing device.

BACKGROUND

At present, deep learning techniques based on an artificial neural network have made great progress in fields such as object classification, text processing, engine recommendation, image search, face recognition, age and speech recognition, human-machine dialogue, emotional computing and so on. With the deepening of an artificial neural network structure and the improvement of algorithms, the deep learning techniques have made breakthrough progress in the field of human-like data perception, and the deep learning techniques can be used to describe image content, recognize objects in complex environments in an image, perform speech recognition in noisy environments, and the like. At the same time, the deep learning techniques can also be used to solve a problem of image generation and fusion.

SUMMARY

At least one embodiment of the present disclosure provides a training method of a neural network for implementing image style transfer, comprising: acquiring a first training input image and a second training input image; inputting the first training input image to the neural network; performing a style transfer process on the first training input image by using the neural network, so as to obtain a training output image; based on the first training input image, the second training input image and the training output image, calculating a loss value of parameters of the neural network through a loss function; and modifying the parameters of the neural network according to the loss value, in a case where the loss function satisfies a predetermined condition, obtaining a trained neural network, and in a case where the loss function does not satisfy the predetermined condition, continuing to input the first training input image and the second training input image so as to repeatedly perform the above training process, the loss function comprising a weight-bias-ratio loss function.

For example, in the training method provided by an embodiment of the present disclosure, the neural network comprises a first convolutional neural network, the first convolutional neural network comprises a plurality of first convolutional kernels and a plurality of biases, and the parameters of the neural network comprise the plurality of first convolutional kernels and the plurality of biases, the weight-bias-ratio loss function is expressed as:

$$L_{L1} = \frac{W}{B+\varepsilon}$$

where $L_{L1}$ represents the weight-bias-ratio loss function, W is an average value of absolute values of the plurality of first convolutional kernels, B is an average value of absolute values of the plurality of biases, and $\varepsilon$ is a positive number.

For example, in the training method provided by an embodiment of the present disclosure, calculating the loss value of the parameters of the neural network through the loss function comprises: calculating a weight-bias-ratio loss value of the parameters of the neural network by the weight-bias-ratio loss function according to the plurality of first convolutional kernels and the plurality of biases, and the loss value comprises the weight-bias-ratio loss value.

For example, in the training method provided by an embodiment of the present disclosure, modifying the parameters of the neural network according to the loss value comprises: adjusting a ratio between the plurality of first convolutional kernels and the plurality of biases according to the weight-bias-ratio loss value.

For example, in the training method provided by an embodiment of the present disclosure, the neural network further comprises a first conversion matrix, the first training input image has a first training input color channel, a second training input color channel and a third training input color channel, inputting the first training input image to the neural network comprises: converting the first training input image into a first training intermediate image by the first conversion matrix; and inputting the first training intermediate image to the neural network; where converting the first training input image into the first training intermediate image by the first conversion matrix comprises: converting, by the first conversion matrix, data information of the first training input color channel, data information of the second training input color channel and data information of the third training input color channel of the first training input image into data information of a first training luminance channel, data information of a first training color difference channel and data information of a second training color difference channel of the first training intermediate image.

For example, in the training method provided by an embodiment of the present disclosure, the first convolutional neural network comprises a first sub-network, a second sub-network and a third sub-network, performing the style transfer process on the first training input image by using the neural network so as to obtain the training output image comprises: performing the style transfer process on the data information of the first training luminance channel of the first training intermediate image, the data information of the first training color difference channel of the first training intermediate image, and the data information of the second training color difference channel of the first training intermediate image by using the first sub-network, the second sub-network and the third sub-network respectively, so as to generate data information of a second training luminance channel of a second training intermediate image, data information of a third training color difference channel of the second training intermediate image, and data information of a fourth training color difference channel of the second training intermediate image; converting the second training intermediate image into the training output image, where the training output image is an image in a RGB format, and the second training intermediate image is an image in a YUV format.

For example, in the training method provided by an embodiment of the present disclosure, the neural network further comprises a second conversion matrix, converting the second training intermediate image into the training output image comprises: converting, by the second conversion matrix, the data information of the second training luminance channel of the second training intermediate image, the data information of the third training color difference channel of the second training intermediate image and the data information of the fourth training color difference channel of the second training intermediate image into data information of a first training output color channel of the training output image, data information of a second training output color channel of the training output image and data information of a third training output color channel of the training output image.

For example, in the training method provided by an embodiment of the present disclosure, the first sub-network comprises a first set of first convolutional layers, the second sub-network comprises a second set of first convolutional layers, and the third sub-network comprises a third set of first convolutional layers, the second sub-network comprises a first standard up-sampling layer and a first standard down-sampling layer, and the third sub-network comprises a second standard up-sampling layer and a second standard down-sampling layer; the first standard down-sampling layer is used to replace an initial first convolutional layer in the second set of first convolutional layers of the second sub-network, the first standard up-sampling layer is used to replace a last first convolutional layer in the second set of first convolutional layers of the second sub-network; the second standard down-sampling layer is used to replace an initial first convolutional layer in the third set of first convolutional layers of the third sub-network, the second standard up-sampling layer is used to replace a last first convolutional layer in the third set of first convolutional layers of the third sub-network.

For example, in the training method provided by an embodiment of the present disclosure, the loss function further comprises a content loss function, calculating the loss value of the parameters of the neural network through the loss function based on the first training input image, the second training input image and the training output image further comprises: extracting a first training input feature of the first training input image and extracting a first training output feature of the training output image by an analysis network; and calculating a content loss value of the parameters of the neural network by the content loss function, according to the first training input feature and the first training output feature, and the loss value comprises the content loss value.

For example, in the training method provided by an embodiment of the present disclosure, the loss function further comprises a style loss function, calculating the loss value of the parameters of the neural network through the loss function based on the first training input image, the second training input image and the training output image further comprises: extracting a second training input feature of the second training input image and extracting a second training output feature of the training output image by the analysis network; and calculating a style loss value of the parameters of the neural network by the style loss function, according to the second training input feature and the second training output feature, and the loss value comprises the style loss value.

For example, in the training method provided by an embodiment of the present disclosure, both the first training input feature and the first training output feature are content features, and both the second training input feature and the second training output feature are style features.

For example, in the training method provided by an embodiment of the present disclosure, the analysis network comprises a second convolutional neural network, the second convolutional neural network comprises a plurality of second convolutional layers sequentially connected and a plurality of second pooling layers interposed between adjacent second convolutional layers, each of the plurality of second convolutional layers is used for extracting the first training input feature, the first training output feature, the second training output feature and/or the second training input feature, a l-th second convolutional layer has $N_l$ second convolutional kernels, the l-th second convolutional layer is used for generating and outputting $N_l$ first training feature images of the first training input image, $N_l$ second training feature images and $N_l$ third training feature images of the training output image, and $N_l$ fourth training feature images of the second training input image, and the $N_l$ convolutional kernels are in one-to-one correspondence to the $N_l$ first training feature images, to the $N_l$ second training feature images, to the $N_l$ third training feature images and to the $N_l$ fourth training feature images, respectively, the $N_l$ first training feature images, the $N_l$ second training feature images, the $N_l$ third training feature images and the $N_l$ fourth training feature images have same size.

For example, in the training method provided by an embodiment of the present disclosure, a content loss function of the l-th second convolutional layer is expressed as:

$$C_l = \frac{1}{2 \cdot S_1} \sum_{ij} (F_{ij}^l - P_{ij}^l)^2$$

where $C_l$ represents the content loss function, $F_{ij}^l$ denotes a value of a j-th position in a first training feature image corresponding to an i-th second convolutional kernel of the l-th second convolutional layer, $P_{ij}^l$ denotes a value of a j-th position in a third training feature image corresponding to the i-th second convolutional kernel of the l-th second convolutional layer, $S_1$ a constant, a total content loss function is expressed as:

$$L_{content} = \sum_{l=0}^{Q1} w_{1l} \cdot C_l$$

where $L_{content}$ represents the total content loss function, Q1 is a positive integer, and denotes a number of second convolutional layers for extracting and outputting the first training input feature and the first training output feature, and $w_{1l}$ represents a weight of the $C_l$;

a style loss function of the l-th second convolutional layer is expressed as:

$$E_l = \frac{1}{4 \cdot N_l^2 \cdot M_l^2 \cdot S_2} \sum_{i,j} (G_{ij}^l - A_{ij}^l)^2$$

where $E_l$ represents the style loss function, $M_l$ represents a size of a fourth training feature image, $A_{ij}^l$ denotes a value of a j-th position in a Gram matrix of a second training feature image corresponding to the i-th second convolutional kernel of the l-th second convolutional layer, $G_{ij}^l$ denotes a value of a j-th position in a Gram matrix of a fourth training feature image corresponding to the i-th second convolutional kernel of the l-th second convolutional layer, S2 is a constant, a total style loss function is expressed as:

$$L_{style} = \sum_{l=0}^{Q2} w_{2l} \cdot E_l$$

where $L_{style}$ represents the total style loss function, Q2 is a positive integer, and denotes a number of second convolutional layers for extracting and outputting the second training input feature and the second training output feature, and $w_{2l}$ represents a weight of the $E_l$.

At least one embodiment of the present disclosure further provides an image processing method for implementing image style transfer based on a neural network, the neural network is a neural network obtained by training according to the training method according to any one of the above embodiments, and the image processing method comprises: acquiring a first image; inputting the first image to the neural network; and performing a style transfer process on the first image by using the neural network to generate a second image.

For example, in the image processing method provided by an embodiment of the present disclosure, the neural network further comprises a first conversion matrix, and the first image has a first input color channel, a second input color channel and a third input color channel, inputting the first image to the neural network comprises: converting the first image into a first intermediate image by the first conversion matrix; and inputting the first intermediate image into the neural network; where converting the first image into the first intermediate image by the first conversion matrix comprises: converting, by the first conversion matrix, data information of the first input color channel of the first image, data information of the second input color channel of the first image and data information of the third input color channel of the first image into data information of a first luminance channel of the first intermediate image, data information of a first color difference channel of the first intermediate image and data information of a second color difference channel of the first intermediate image.

For example, in the image processing method provided by an embodiment of the present disclosure, the neural network further comprises a first convolutional neural network, the first convolutional neural network comprises a first sub-network, a second sub-network and a third sub-network, performing a style transfer process on the first image by using the neural network to generate a second image comprises: performing the style transfer processing on the data information of the first luminance channel of the first intermediate image, the data information of the first color difference channel of the first intermediate image and the data information of the second color difference channel of the first intermediate image by using the first sub-network, the second sub-network and the third sub-network, respectively, so as to generate data information of a second luminance channel of a second intermediate image, data information of a third color difference channel of the second intermediate image and data information of a fourth color difference channel of the second intermediate image; converting the second intermediate image into the second image, the second image being an image in a RGB format, and the second intermediate image being an image in a YUV format.

For example, in the image processing method provided by an embodiment of the present disclosure, the neural network further comprises a second conversion matrix, converting the second intermediate image into the second image comprises: converting, by the second conversion matrix, the data information of the second luminance channel of the second intermediate image, the data information of the third color difference channel of the second intermediate image and the data information of the fourth color difference channel of the second intermediate image into data information of a first output color channel of the second image, data information of a second output color channel of the second image and data information of a third output color channel of the second image.

At least one embodiment of the present disclosure further provides an image processing device, comprising: an image acquisition module, configured to acquire a first image; an image processing module, comprising a neural network obtained by training according to the training method according to any one of the above embodiments, the image processing module being used for performing a style transfer process on the first image by using the neural network to generate a second image.

For example, the image processing device provided by an embodiment of the present disclosure further comprises a first conversion module, the first image has a first input color channel, a second input color channel and a third input color channel, the first conversion module is used for converting data information of the first input color channel of the first image, data information of the second input color channel of the first image and data information of the third input color channel of the first image into data information of a first luminance channel of a first intermediate image, data information of a first color difference channel of the first intermediate image, and data information of a second color difference channel of the first intermediate image, and the neural network comprises a first sub-network, a second sub-network and a third sub-network, the first sub-network, the second sub-network and the third sub-network are respectively used for processing the data information of the first luminance channel of the first intermediate image, the data information of the first color difference channel of the first intermediate image, and the data information of the second color difference channel of the first intermediate image, so as to generate data information of a second luminance channel of a second intermediate image, data information of a third color difference channel of the second intermediate image, and data information of a fourth color difference channel of the second intermediate image.

For example, the image processing device provided by an embodiment of the present disclosure further comprises a second conversion module, the second conversion module is used to convert the data information of the second luminance channel of the second intermediate image, the data information of the third color difference channel of the second intermediate image, and the data information of the fourth color difference channel of the second intermediate image into data information of a first output color channel of the second image, data information of a second output color channel of the second image and data information of a third output color channel of the second image.

For example, in the image processing device provided by an embodiment of the present disclosure, the first sub-network comprises a first set of first convolutional layers, the second sub-network comprises a second set of first convolutional layers, and the third sub-network comprises a third set of first convolutional layers; the second sub-network comprises a first standard up-sampling layer and a first standard down-sampling layer, and the third sub-network comprises a second standard up-sampling layer and a second standard down-sampling layer; the first standard down-sampling layer is used to replace an initial first convolutional layer in the second set of first convolutional layers of the second sub-network, the first standard up-sampling layer is used to replace a last first convolutional layer in the second set of first convolutional layers of the second sub-network; the second standard down-sampling layer is used to replace an initial first convolutional layer in the third set of first convolutional layers of the third sub-network, the second standard up-sampling layer is used to replace a last first convolutional layer in the third set of first convolutional layers of the third sub-network.

At least one embodiment of the present disclosure further provides an image processing device, comprising: a memory for storing non-temporary computer-readable instructions; and a processor for executing the computer-readable instructions, the training method according to any one of the above embodiments being performed while the computer-readable instructions are executed by the processor.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
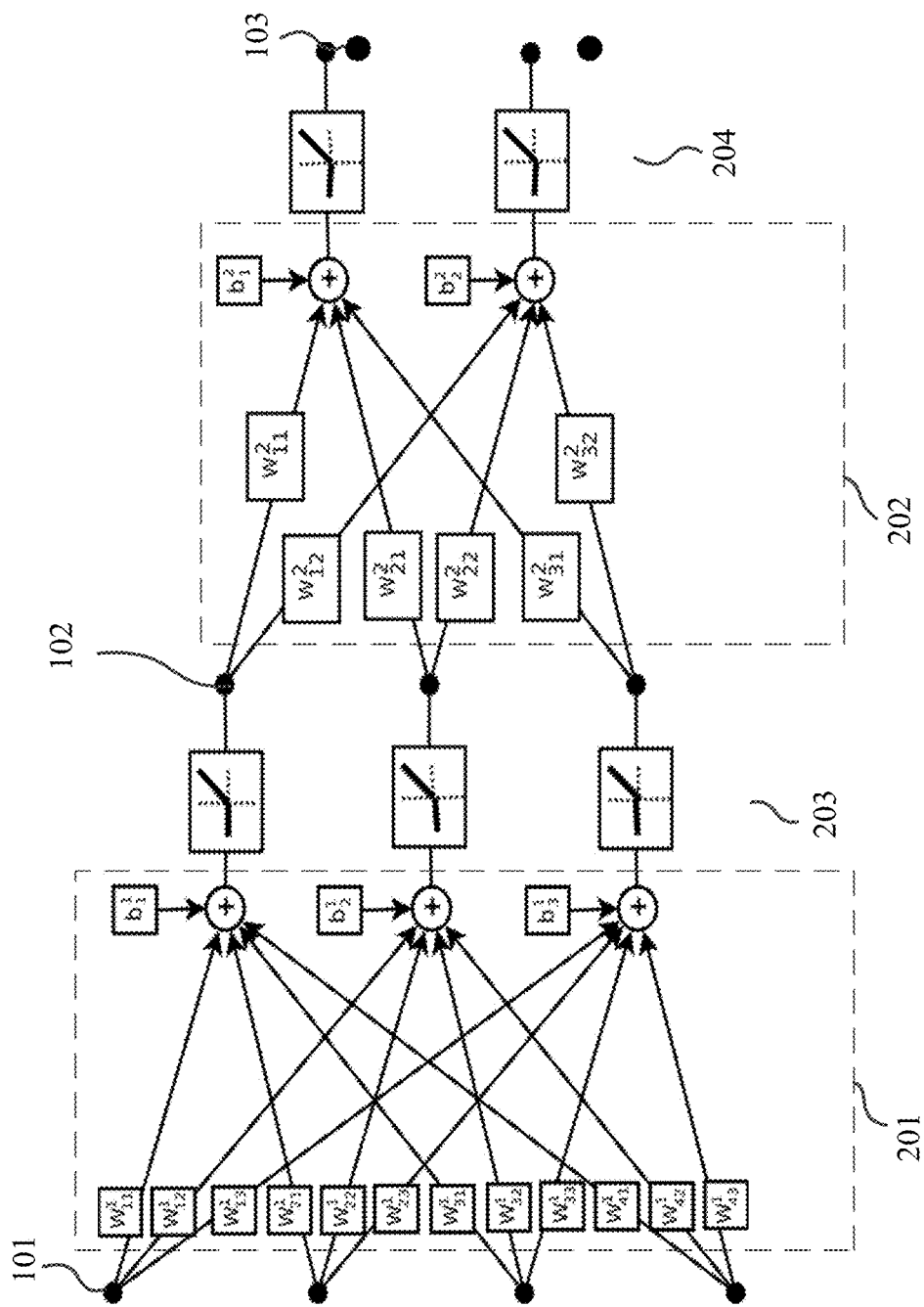
FIG. 1 is a schematic diagram of a convolutional neural network.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to make following descriptions of the embodiments of the present disclosure clear and concise, the present disclosure omits detailed descriptions of known functions and known components.

Nowadays, with development of image processing technology, a method of performing a style transfer process on an image has gradually become a research hotspot in a field of image processing. Converting an image into a picture with some artistic style can be applied to image processing based on cloud computation, style rendering, digital galleries and other products and services.

The artistic style transfer of pictures with aid of a deep neural network is a technology that has emerged with development of deep learning technology. For example, based on a style given in a reference image, an input image is processed to obtain an output image that at least partially reflects the style. For example, the reference image is a work of a certain artist, and then the output image may show some style features of the artist's painting while retaining an original content, even making people mistake it as the artist's work. This style transfer effect cannot be achieved by traditional image processing effects (such as various filters provided by instagram corporation, etc.).

At least one embodiment of the present disclosure provides a training method of a neural network for implementing image style transfer, an image processing method for implementing image style transfer based on a neural network and an image processing device. By adopting or adding a weight-bias-ratio (L1) loss function as or in a loss function used in a process of training neural network, the role of an activation function in the neural network is played better, more optimized convolutional parameters are obtained, and effects of image style transfer and image fusion are improved. Thus, the processing effect, processing speed and other aspects are all taken into account at the same time, and an application prospect is better and wider.

An original convolutional neural network (CNN) is mainly used to recognize two-dimensional shapes, and has a characteristic of highly invariant to translation, scale scaling, tilting or deformation of other forms of images. CNN mainly simplifies the complexity of neural network models and reduces the number of weights by local perception field and weight sharing. With the development of deep learning technology, an application scope of the CNN is no longer limited to just the field of image recognition, and the CNN may also be applied to face recognition, character recognition, animal classification, image processing and other fields.

FIG. 1 is a schematic diagram of a convolutional neural network. For example, the convolutional neural network may be used for image processing, the convolutional neural network uses images as an input and an output, and replaces weights of scalar by convolutional kernels. FIG. 1 shows merely a convolutional neural network with a three-layer structure, and embodiments of the present disclosure are not limited thereto. As shown in FIG. 1, the convolutional neural network includes an input layer 101, a hidden layer 102 and an output layer 103. The input layer 101 has four inputs, the hidden layer 102 has three outputs and the output layer 103 has two outputs. Finally, the convolutional neural network outputs two images.

For example, the four inputs of the input layer 101 may be four images, or four features of one image. The three outputs of the hidden layer 102 may be feature images of an image inputted through the input layer 101.

For example, as shown in FIG. 1, a convolutional layer has a weight $W_{ij}^{k}$ and a bias $b_i^{k}$. The weight $W_{ij}^{k}$ represents a convolutional kernel, and the bias $b_i^{k}$ is a scalar superimposed on an output of the convolutional layer, where k indicates a label of the inputsss layer 101, i and j are labels of a unit of the input layer 101 and a unit of the hidden layer 102, respectively. For example, a first convolutional layer 201 includes a first set of convolutional kernels ($w_{ij}^{1}$ in FIG. 1) and a first set of biases ($b_i^{1}$, in FIG. 1). A second convolutional layer 202 includes a second set of convolutional kernels ($w_{ij}^{2}$ in FIG. 1) and a second set of biases ($b_i^{2}$ in FIG. 1). Generally, each convolutional layer includes dozens or hundreds of convolutional kernels, and if the convolutional neural network is a deep convolutional neural network, then the convolutional neural network may include at least five convolutional layers.

For example, as shown in FIG. 1, the convolutional neural network further includes a first activation layer 203 and a second activation layer 204. The first activation layer 203 is arranged behind the first convolutional layer 201, and the second activation layer 204 is arranged behind the second convolutional layer 202. The activation layer (e.g., the first activation layer 203 and the second activation layer 204) include an activation function, the activation function is used for introducing nonlinear factors into the convolutional neural network, so that the convolutional neural network can solve more complex problems better. The activation function may include a Rectified Linear Unit (ReLU) function, a S-type function (sigmoid function), a hyperbolic tangent function (tanh function), or the like. The ReLU function is an unsaturated nonlinear function, and the Sigmoid function and the tanh function are saturated nonlinear functions. For example, the activation layer may be a single layer of the convolutional neural network alone, or the activation layer may also be included in a convolutional layer (for example, the first convolutional layer 201 may include the first activation layer 203, and the second convolutional layer 202 may include the second activation layer 204).

For example, in the first convolutional layer 201, firstly, several convolutional kernels $w_{ij}^{1}$ in the first set of convolutional kernels and several biases $b_i^{1}$ in the first set of biases are applied to each of the inputs, so as to obtain outputs of the first convolutional layer 201; afterwards, the outputs of the first convolutional layer 201 can be processed by the first activation layer 203, so as to obtain outputs of the first activation layer 203. In the second convolutional layer 202, firstly, several convolutional kernels $w_{ij}^{2}$ in the second set of convolutional kernels and several biases $b_i^{2}$ in the second set of biases are applied to the outputs of the first activation layer 203 inputted to the second convolutional layer 202, so as to obtain outputs of the second convolutional layer 202; afterwards, the outputs of the second convolutional layer 202 may be processed by the second activation layer 204, so as to obtain outputs of the second activation layer 204. For example, an output of the first convolutional layer 201 may be a result that is obtained by applying the convolutional kernels $w_{ij}^{1}$ to an input of the first convolutional layer 201 and then adding it to a bias $b_i^{1}$, and an output of the second convolutional layer 202 may be a result that is obtained by applying the convolutional kernels $w_{ij}^{2}$ to an output of the first activation layer 203 and then adding it to a bias $b_i^{2}$.

Before performing an image processing by a convolutional neural network, the convolutional neural network needs to be trained. After training, convolutional kernels and biases of the convolutional neural network remain unchanged during image processing. In the training process, each convolutional kernel and each bias are adjusted by a plurality of input/output sample images and optimization algorithms, so as to obtain an optimized convolutional neural network model.

Figure 2A:
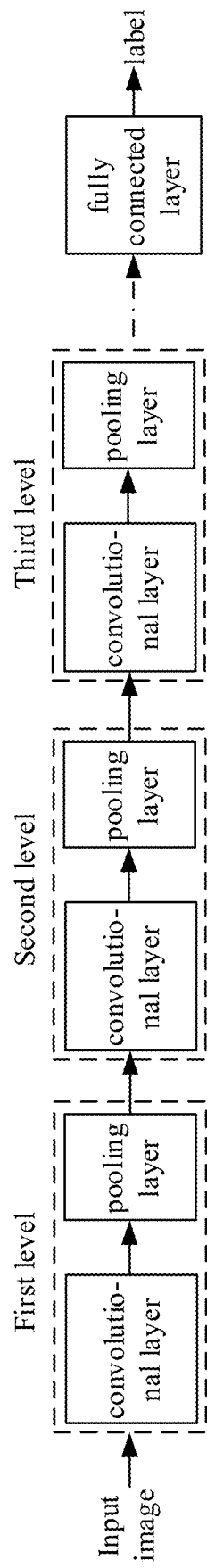
FIG. 2A is an exemplary model diagram of a convolutional neural network.
Figure 2B:
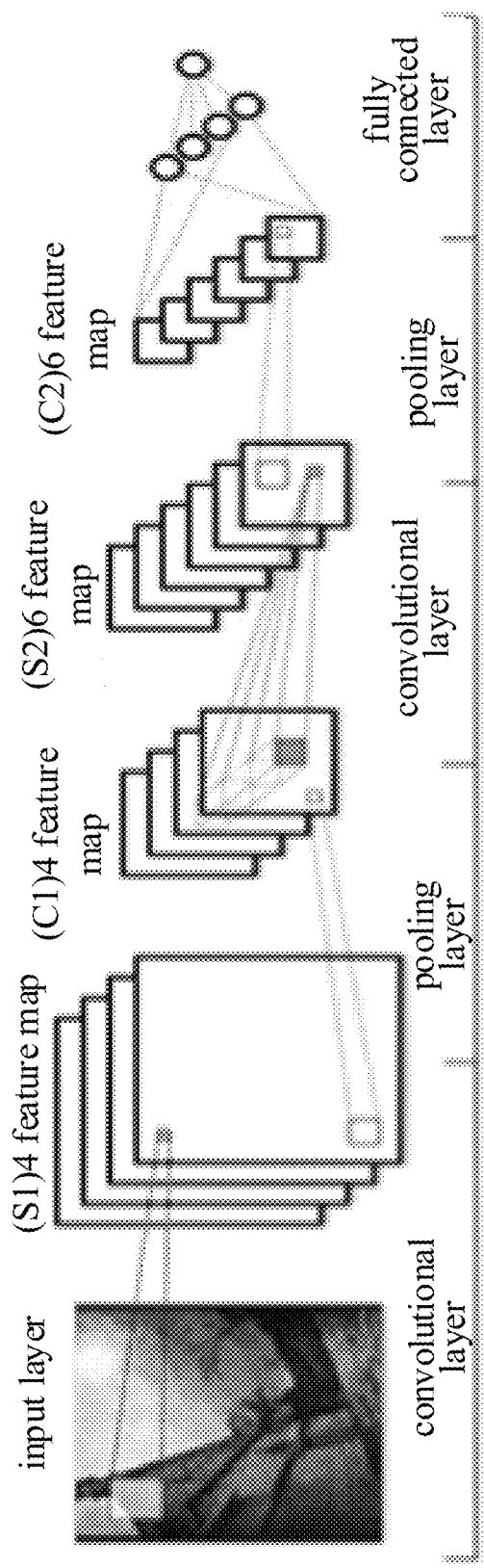
FIG. 2B is a schematic diagram of a working process of a convolutional neural network.

FIG. 2A is an exemplary model diagram of a convolutional neural network, and FIG. 2B is a schematic diagram of a working process of a convolutional neural network. For example, as shown in FIGS. 2A and 2B, after an input image is input to a convolutional neural network via an input layer, a class identifier of the input image is output after the input image is processed through several processing steps (such as each level in FIG. 2A) in sequence. The constituent parts of the convolutional neural network may include a plurality of convolutional layers, a plurality of pooling layers and a fully connected layer. For example, a complete convolutional neural network may be composed of these three layers in a superposing manner. For example, FIG. 2A merely shows three levels of a convolutional neural network, that is, a first level, a second level and a third level, and each level includes a convolutional layer and a pooling layer, and the pooling layer is a sub-sampling layer. Thus, the processing procedure at each level may include performing convolution and sub-sampling on an input image. According to actual needs, for example, the processing procedure at each level may further include a local constant normalization (LCN) processing and so on.

A convolutional layer is a core layer of a convolutional neural network. In the convolutional layer of the convolutional neural network, one neuron is only connected to neurons in some adjacent layers. The convolutional layer can apply several convolutional kernels to an input image, so as to extract features of various types of the input image. Each of the convolutional kernels can extract a feature of one type. The convolutional kernels are usually initialized in a form of a random fractional matrix, and in the training process of the convolutional neural network, the convolutional kernels will go through learning to obtain reasonable weights. A result obtained by applying one convolutional kernel to an input image is called as a feature map, and the number of feature maps is equal to the number of convolutional kernels. Each of the feature maps is composed of some neurons arranged in a matrix, and neurons of the same feature map share weights, and the shared weights are convolutional kernels. A feature map outputted from a convolutional layer at a level may be input to a convolutional layer at the adjacent next level, and is processed again to obtain a new feature map. For example, as shown in FIG. 2A, a convolutional layer of a first level may output a first feature map, and the first feature map is input to a convolutional layer of a second level to be processed again, so as to obtain a second feature map.

For example, as shown in FIG. 2B, a convolutional layer can use different convolutional kernels to convolute data of a local receptive field of an input image, and a convoluting result is inputted into an activation layer, and the activation layer performs calculation according to a corresponding activation function so as to obtain feature information of the input image.

For example, as shown in FIGS. 2A and 2B, a pooling layer is between adjacent convolutional layers, and is a form of down-sampling. On the one hand, the pooling layer can be used to reduce the scale of an input image, simplify the computational complexity, and reduce the phenomenon of over-fitting to a certain extent; on the other hand, the pooling layer can also be used to perform feature compression, so as to extract main features of the input image. The pooling layer can reduce the sizes of the feature images, but does not change the number of feature images. For example, as regards an input image having a size of 12×12, the input image is sampled by a filter having a size of 6×6, and then an output image having a size of 2×2 can be obtained, and this means that 36 pixels in the input image are merged into one pixel in the output image. The last pooling layer or convolutional layer may be connected to one or more fully connected layers, the fully connected layer is used to connect all the extracted features. An output of the fully connected layer is a one-dimensional matrix, that is, a vector.

Figure 3:
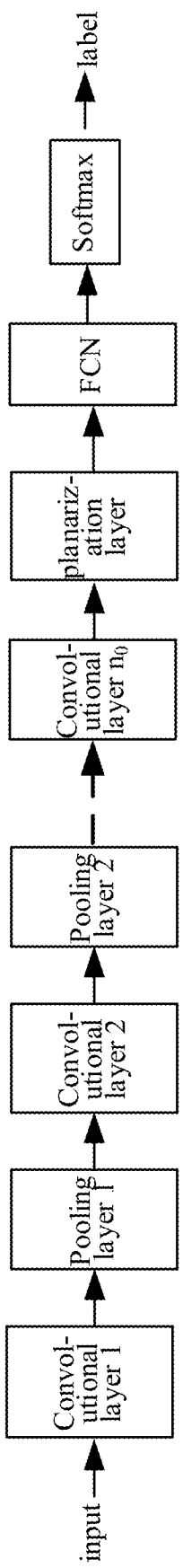
FIG. 3 is a schematic structural view of another convolutional neural network.

FIG. 3 is a schematic structural view of another convolutional neural network. For example, referring to the example shown in FIG. 3, an output of the last convolutional layer (that is, an $n_0$-th convolutional layer) is input to a planarization layer for a planarization (Flatten) operation.

The planarization layer can convert a feature image (a 2D image) into a vector (1D). The planarization operation may be performed as follows:

$$V_k = f_{k|j,k\%j}$$

where v is a vector containing k elements, and f is a matrix with i rows and j columns Next, the output (i.e., the 1D vector) of the planarization layer is input to a fully connected layer. The fully connected layer may have the same structure as the convolutional neural network, but the difference between the fully connected layer and the convolutional neural network is that the fully connected layer uses different scalar values to replace convolutional kernels.

For example, the output of the last convolutional layer may also be input to a homogenization layer (AVG). The homogenization layer is used for performing an average operation on the output, that is, an average value of a feature image is used to represent an output image, and therefore, a 2D feature image is converted into a scalar. For example, if the convolutional neural network includes a homogenization layer, then it may not include a planarization layer.

For example, according to the actual needs, the homogenization layer or the fully connected layer may be connected to a classifier, the classifier can perform a classification operation according to the extracted features, and an output of the classifier may act as the final output of the convolutional neural network, i.e., a category label that represents a category of an image.

For example, the classifier may be a support vector machine (SVM) classifier, a softmax classifier, a k-nearest neighbor (KNN) rule classifier, etc. As shown in FIG. 3, in one example, the convolutional neural network includes a softmax classifier, the softmax classifier is a generator of a logical function and can compress a K-dimensional vector z containing any real number into a K-dimensional vector σ(z). The formula of the softmax classifier is as follows:

$$\sigma(z)_j = \frac{e^{z_j}}{\sum_{k=1}^{K} e^{z_k}}, j = 1, 2, \ldots, k.$$

where $Z_j$ represents a j-th element in the K-dimensional vector z, σ(z) represents a prediction probability of each category label and is a real number, a range of σ(z) is (0,1), and a sum of the K-dimensional vector σ(z) is 1. According to the above formula, each category label in the K-dimensional vector z is given a certain prediction probability, and the category label with the maximum prediction probability is selected as the identifier or category of the input image.

Figure 4A:
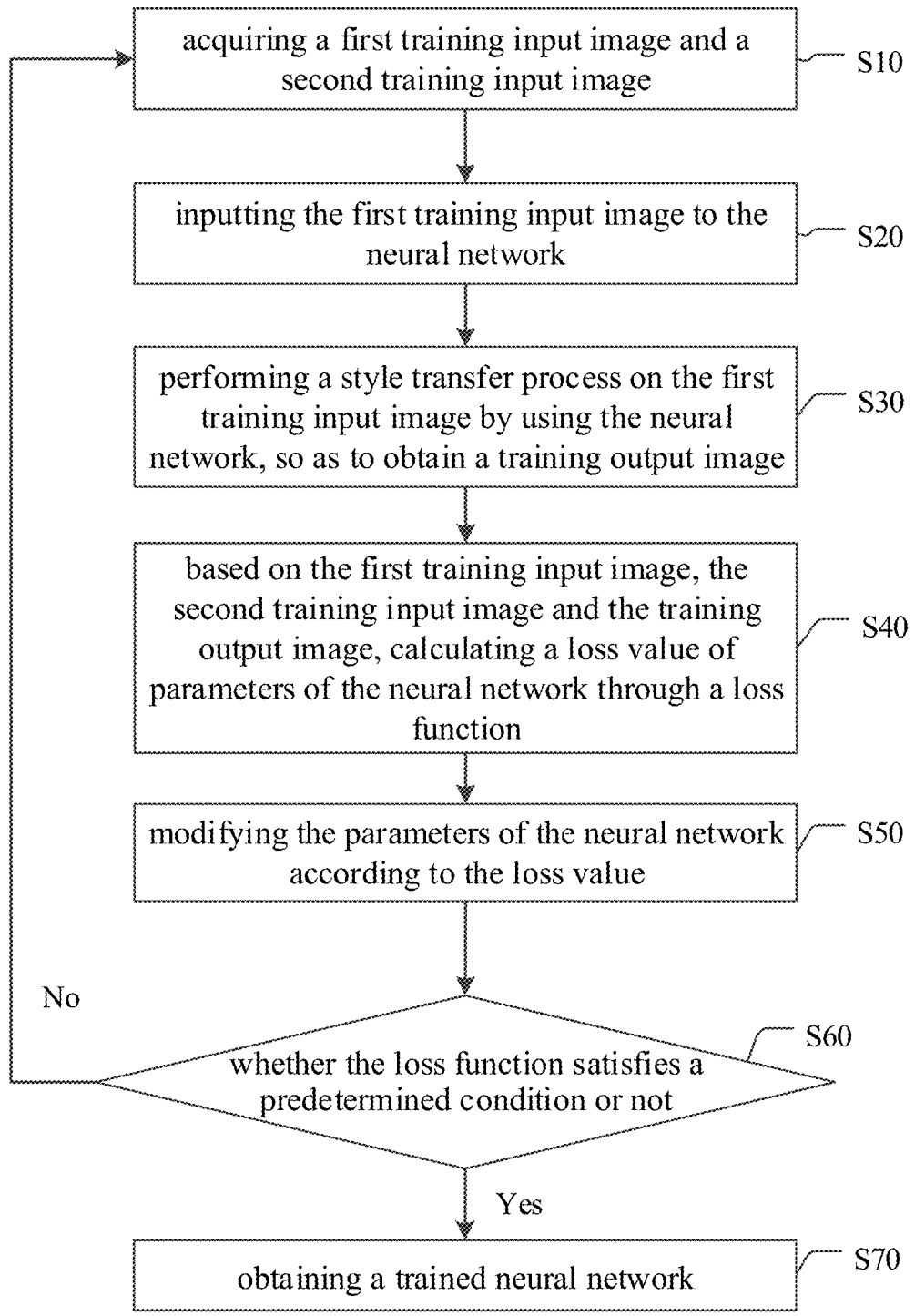
FIG. 4A is a flowchart of a training method of a neural network for implementing image style transfer provided by an embodiment of the present disclosure.
Figure 4B:
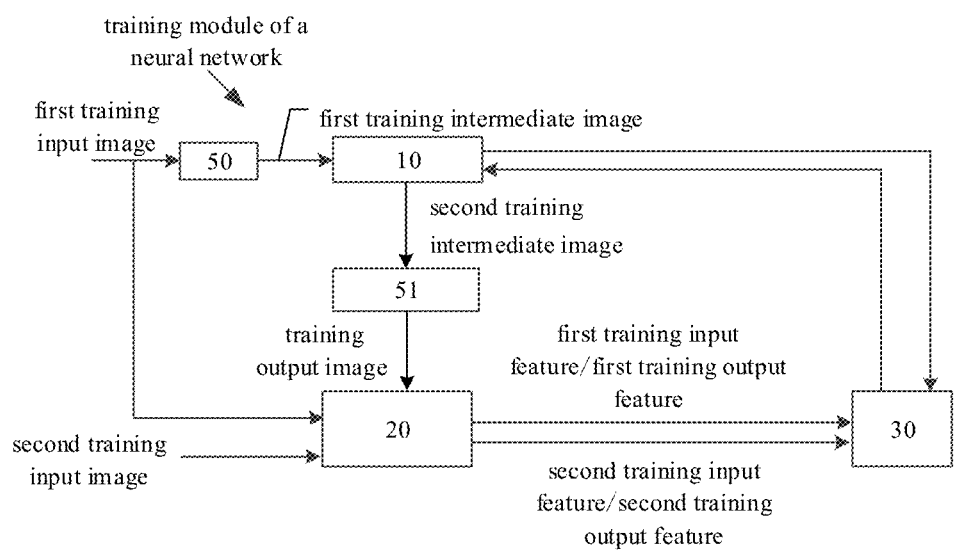
FIG. 4B is a schematic block diagram of a training module of a neural network during a training process provided by an embodiment of the present disclosure.

FIG. 4A is a flowchart of a training method of a neural network for implementing image style transfer provided by an embodiment of the present disclosure, and FIG. 4B is a schematic block diagram of a training module of a neural network during a training process provided by an embodiment of the present disclosure.

For example, as shown in FIG. 4A, the training method of a neural network for implementing image style transfer provided by an embodiment of the present disclosure includes:

step S10: acquiring a first training input image and a second training input image;

step S20: inputting the first training input image to the neural network;

Step S30: performing a style transfer process on the first training input image by using the neural network, so as to obtain a training output image;

Step S40: based on the first training input image, the second training input image and the training output image, calculating a loss value of parameters of the neural network through a loss function;

step S50: modifying the parameters of the neural network according to the loss value;

Step S60: determining whether the loss function satisfies a predetermined condition or not;

in a case where the loss function satisfies the predetermined condition, performing a step S70: obtaining a trained neural network;

in a case where the loss function does not satisfy the predetermined condition, returning to the step S10, that is, continuing to input the first training input image and the second training input image, so as to repeatedly perform the above training process.

For example, as shown in FIG. 4B, during the training process, a training module of the neural network includes a neural network, an analysis network, and a loss function 30. The neural network includes a first convolutional neural network 10. For example, the first convolution neural network 10 is used for performing a style transfer process on the inputted first training input image, so as to generate a training output image. The loss function 30 is used to calculate the loss value of the parameters of the first convolutional neural network 10, and to modify the parameters of the first convolutional neural network 10 according to the loss value. Here, the loss function 30 includes a weight-bias-ratio (L1) loss function.

For example, in an example, the predetermined condition corresponds to minimization of the loss value of the neural network under the condition of a certain number of first training input image inputs. In another example, the predetermined condition is that the number of training times or the number of the training period of the neural network reaches a predetermined number.

It should be noted that, the above example is merely used to exemplarily illustrate the training process of the neural network. Those skilled in the art should know that, in the training phase, a large number of sample images need to be used to train the neural network; at the same time, in the training process of each of the sample images, multiple repeated iterations may be included to modify the parameters of the neural network. For another example, the training phase further includes fine-tuning the parameters of the neural network, so as to obtain more optimized parameters.

For example, initial parameters of the first convolutional neural network 10 may be random numbers, and for example, the random numbers conform to Gaussian distribution. The initial parameters of the first convolutional neural network 10 may also adopt trained parameters in an image database such as ImageNet or the like. Embodiments of the present disclosure do not limit this.

For example, the loss function 30 can calculate the loss value based on the initial parameters of the first convolutional neural network 10. The loss value may be back-propagated layer-by-layer from an output layer of the first convolutional neural network 10 to an input layer, so that the loss value can be shared by all units of each layer of the first convolutional neural network 10, thereby obtaining an error value of each unit. The error value is the basis for modifying parameters of each unit. For example, the error value may be expressed as a partial derivative of the loss value to each parameters of each unit.

For example, the training module of the neural network may further include an optimization function (not shown), the optimization function can calculate the error values of the parameters of the first convolutional neural network 10 according to the loss value, and parameters of the first convolutional neural network 10 are adjusted according to the error values.

For example, the optimization function can adopt a stochastic gradient descent (SGD) algorithm, a batch gradient descent (BGD) algorithm or the like to calculate the error values of the parameters of the first convolutional neural network 10.

For example, the first training input image may be an image of various types. For example, the first training input image may be an image taken by a digital camera or a mobile phone, and may be a person image, an animal or plant image, a landscape image, etc.

For the neural network provided by the embodiment of the present disclosure, by adding a weight-bias-ratio loss function (L1 loss function) to the loss function, the role of an activation function in the first convolutional neural network can be fully played, more optimized parameters of the first convolutional neural network are obtained, and effects of image style transfer and image fusion are improved. Thus, the processing effect, processing speed and other aspects are all taken into account at the same time, and an application prospect is better and wider.

Figure 5A:
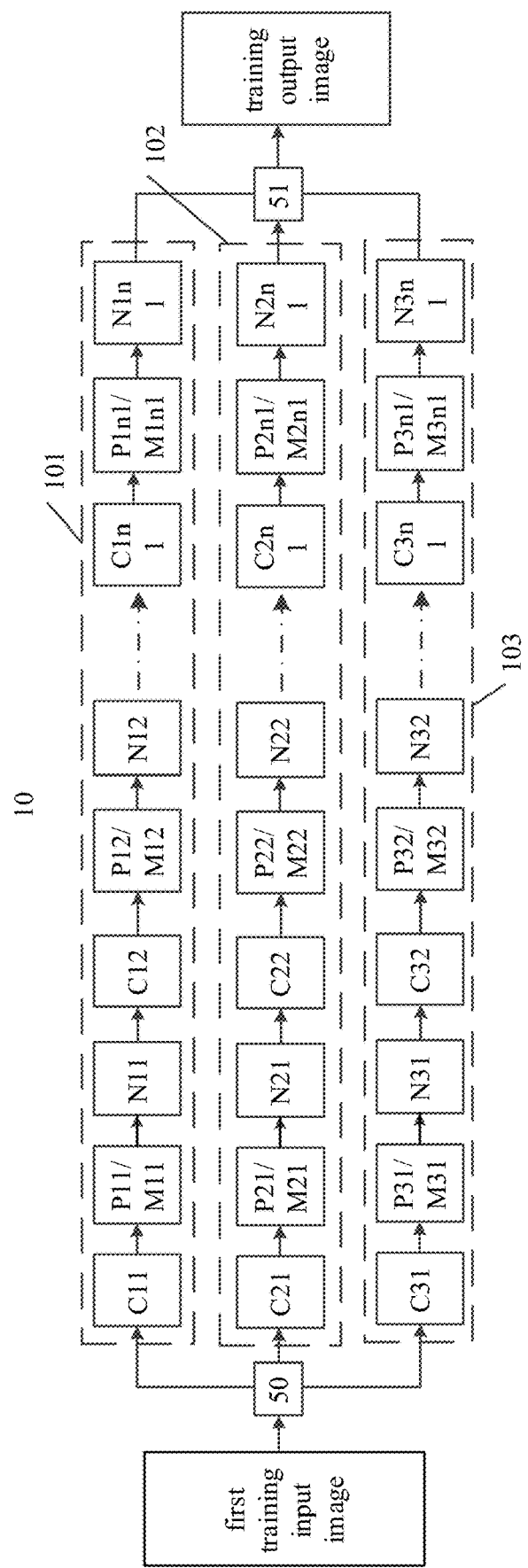
FIG. 5A is a schematic structural view of a first convolutional neural network provided by an embodiment of the present disclosure.
Figure 5B:
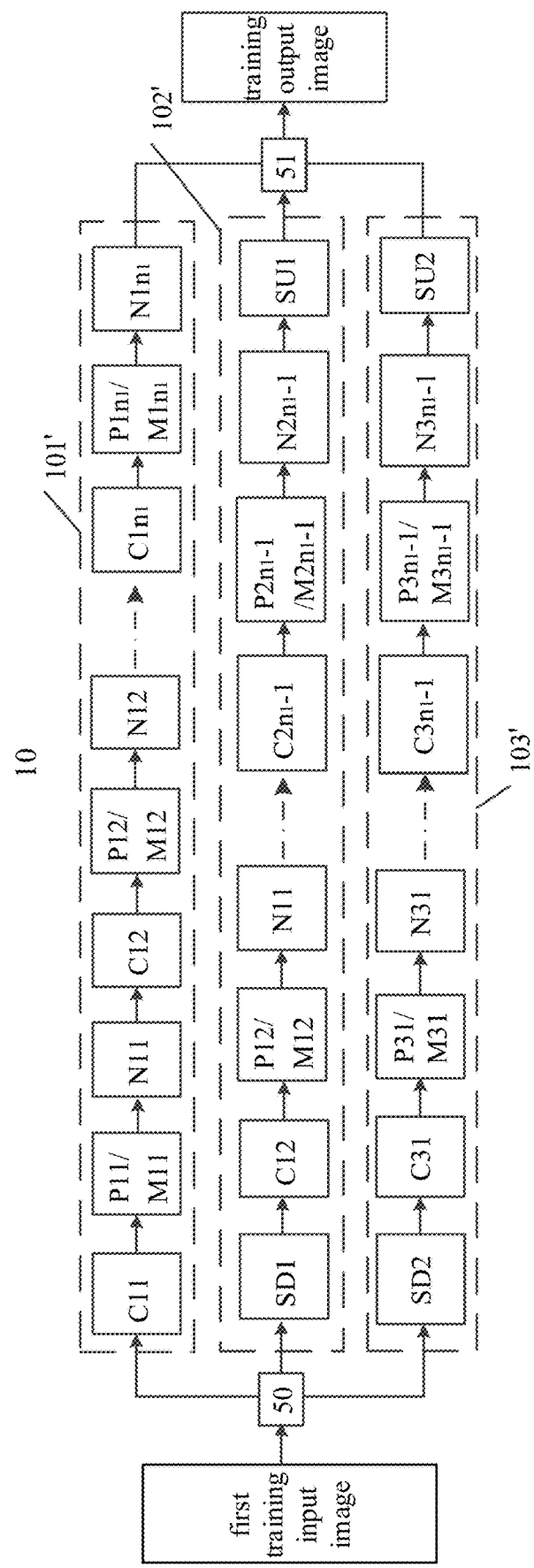
FIG. 5B is a schematic structural view of another first convolutional neural network provided by an embodiment of the present disclosure.

FIG. 5A is a schematic structural view of a first convolutional neural network provided by an embodiment of the present disclosure, and FIG. 5B is a schematic structural view of another first convolutional neural network provided by an embodiment of the present disclosure.

For example, as shown in FIG. 5A, the first convolutional neural network 10 includes a first sub-network 101, a second sub-network 102 and a third sub-network 103. The first sub-network 101 includes a first set of first convolutional layers, the second sub-network 102 includes a second set of first convolutional layers, and the third sub-network 103 includes a third set of first convolutional layers. The first set of first convolutional layers includes F1 first convolutional layers, the second set of first convolutional layers also includes F2 first convolutional layers, and the third set of first convolutional layers also includes F3 first convolutional layers. F1, F2 and F3 are all positive integers, and F1, F2 and F3 may be at least partially identical, and may also be different from one another. As shown in FIG. 5A, for example, the first sub-network 101 includes a first convolutional layer C11, a first convolutional layer C12 and a first convolutional layer $C1n_1$; the second sub-network 102 includes a first convolutional layer C21, a first convolutional layer C22 and a first convolutional layer $C2n_1$; and the third sub-network 103 includes a first convolutional layer C31, a first convolutional layer C32 and a first convolutional layer $C3n_1$.

For example, as shown in FIG. 5A, the first sub-network 101 further includes a plurality of first pooling layers and a plurality of composite layers, the second sub-network 102 further includes a plurality of first pooling layers and a plurality of composite layers, and the third sub-network 103 further includes a plurality of first pooling layers and a plurality of composite layers. For example, the first sub-network 101 includes a first pooling layer P11, a first pooling layer P12 and a first pooling layer $P1n_1$; the second sub-network 102 includes a first pooling layer P21, a first pooling layer P22 and a first pooling layer P2$n_1$; and the third sub-network 103 includes a first pooling layer P31, a first pooling layer P32 and a first pooling layer P3$n_1$. The first sub-network 101 includes a composite layer M11, a composite layer M12 and a composite layer M1$n_1$; the second sub-network 102 includes a composite layer M21, a composite layer M22 and a composite layer M2$n_1$; and the third sub-network 103 includes a composite layer M31, a composite layer M32 and a composite layer M3$n_1$.

For example, the first sub-network 101, the second sub-network 102 and the third sub-network 103 have the same structure. In the following, detailed descriptions will be given by taking the first sub-network 101 as an example.

For example, as shown in FIG. 5A, in the first sub-network 101, a plurality of first convolutional layers are connected sequentially; a first pooling layer is between some adjacent first convolutional layers, and a composite layer is between other adjacent first convolutional layers.

For example, as shown in FIG. 5A, in one example, the first sub-network 101 includes $n_1$ first convolutional layers, $n_1$ is a positive integer, and is typically greater than 3, or even hundreds. The low-level convolutional layer is used to extract the lower-order features (e.g., points, edges, etc.) of a first image; as the level increases, the high-level convolutional layer can extract the higher-order features (e.g., straight lines, bends, triangles, etc.) of the first image. The higher-order features can be obtained by combining lower-order features.

For example, in the first sub-network 101, the number of the plurality of first pooling layers is the same as the number of the plurality of composite layers, and down-sampling factors of the plurality of first pooling layers are in one-to-one correspondence to up-sampling factors of the plurality of composite layers, so that the first image and a second image have the same size. For example, in an example as shown in FIG. 5A, the first sub-network 101 may include $n_1/2$ first pooling layers and $n_1/2$ composite layers, where $n_1$ is a positive even number. For another example, in one example, the first sub-network 101 may include two first pooling layers and two composite layers, and down-sampling factors of the two first pooling layers are 1/x 1 and 1/x2 respectively, then up-sampling factors of the two composite layers are x1 and x2 respectively, x1 and x2 are positive integers.

It should be noted that, the number of the plurality of first pooling layers and the number of the plurality of composite layers may also be different, provided that the first training input image and the training output image that is processed by the first convolutional neural network 10 can have the same size.

For example, the plurality of first pooling layers are located at lower levels of the first sub-network 101, and the plurality of composite layers are located at higher levels of the first sub-network 101. That is, firstly, the first sub-network 101 performs down-sampling on an inputted first image by the first pooling layers, and then performs up-sampling on the first image by the composite layers.

For example, the first convolutional neural network 10 includes a plurality of first convolutional kernels and a plurality of biases, the plurality of first convolutional kernels are first convolutional kernels and biases that are included in all the first convolutional layers of the first convolutional neural network 10, and the parameters of the neural network may include the plurality of first convolutional kernels and the plurality of biases. Thus, the loss function 30 is used to adjust parameters of each first convolutional layer in the first convolutional neural network 10. It should be noted that, parameters of all layers in the first convolutional neural network 10 can be adjusted by the loss function 30.

It should be noted that, the structure of the first sub-network 101, the structure of the second sub-network 102, and the structure of the third sub-network 103 may also be different to each other. For example, in the second sub-network 102, some of the first pooling layers or the composite layers, or the like can be omitted.

For example, as shown in FIG. 5B, in one example, the first convolutional neural network 10 includes a first sub-network 101', a second sub-network 102' and a third sub-network 103'. The first sub-network 101' has the same structure as the first sub-network 101 shown in FIG. 5A. The second sub-network 102' may include a first standard up-sampling layer SU1 and a first standard down-sampling layer SD1, and the third sub-network 103' may include a second standard up-sampling layer SU2 and a second standard down-sampling layer SD2. The first standard down-sampling layer SD1 is used to replace an initial first convolutional layer in the second set of first convolutional layers of the second sub-network 102', the first standard up-sampling layer SU1 is used to replace a last first convolutional layer in the second set of first convolutional layers of the second sub-network 102'; the second standard down-sampling layer SD2 is used to replace an initial first convolutional layer in the third set of first convolutional layers of the third sub-network 103', the second standard up-sampling layer SU2 is used to replace a last first convolutional layer in the third set of first convolutional layers of the third sub-network 103'.

For example, the first standard down-sampling layer SD1 and the second standard down-sampling layer SD2 are used to reduce the resolution of an inputted first training input image, so as to increase the speed of image processing. For example, the first standard down-sampling layer SD1 and the second standard down-sampling layer SD2 are used to reduce values of respective dimensions of a feature image, thereby reducing the data amount of the feature image. The first standard up-sampling layer SU1 and the second standard up-sampling layer SU2 are used to increase values of the respective dimensions of a feature image, thereby increasing the data amount of the feature image.

For example, the first standard down-sampling layer SD1 and the second standard down-sampling layer SD2 may adopt a maximum merging (max pooling) method, an average value merging (average pooling) method, a strided convolution method or other down-sampling methods. The first standard up-sampling layer SU1 and the second standard up-sampling layer SU2 may adopt a strided transposed convolution methods or other up-sampling methods.

For example, the first standard down-sampling layer SD1 may further be used to replace an initial first pooling layer or composite layer in the second sub-network 102', and the first standard up-sampling layer SU1 may further be used to replace a last first pooling layer or composite layer in the second sub-network 102'. The second standard down-sampling layer SD2 may further be used to replace an initial first pooling layer or composite layer in the third sub-network 103', and the second standard up-sampling layer SU2 may further be used to replace a last first pooling layer or composite layer in the third sub-network 103'.

For example, as shown in FIG. 5B, in the second sub-network 102', the first standard down-sampling layer SD1 replaces the initial first convolutional layer and the initial first pooling layer, and the first standard up-sampling layer SU1 replaces the last first convolutional layer and the last composite layer. Therefore, a network model size of the second sub-network 102' is reduced. Similarly, a network model size of the third sub-network 103' is also reduced. Thus, a network model size of the first convolutional neural network 10 is reduced.

For example, the second sub-network 102' and the third sub-network 103' may have the same structure. That is to say, the first standard down-sampling layer SD1 is the same as the second standard down-sampling layer SD2, and the first standard up-sampling layer SU1 is also the same as the second standard up-sampling layer SU2. The structure of the second sub-network 102' and the structure of the third sub-network 103' may be also different. Embodiments of the present disclosure are not limited thereto.

For example, in a convolutional neural network, a convolutional kernel is used to determine how an input image is processed, and a bias is used to determine whether the output of the convolutional kernel is input to a next level or not. Therefore, in an activation layer of the convolutional neural network, the bias can be figuratively compared to "switch", which is used to determine that the convolutional kernel is "opened" or "closed". For different input images, different convolutional kernels can be "opened" or "closed", so as to achieve various effects.

For example, in the embodiments of the present disclosure, as compared to a convolutional kernel, a bias needs to have a relatively large absolute value, so as to play the role of "switch" more effectively. The L1 loss function is used to adjust the ratio between the plurality of first convolutional kernels and the plurality of biases of a first convolutional layer, so as to enhance the effect of an activation function of the first convolutional neural network 10.

For example, the weight-bias-ratio (L1) loss function can be expressed as the following formula (1):

$$L_{L1} = \frac{W}{B+\varepsilon} \quad (1)$$

where $L_{L1}$ represents the L1 loss function, W represents an average value of absolute values of all first convolutional kernels in the first convolutional neural network 10, B represents an average value of absolute values of all biases in the first convolutional neural network 10, $\varepsilon$ is a tiny positive number and used to ensure that the denominator is not 0.

For example, the step S40 may include calculating a weight-bias-ratio loss value of the parameters of the neural network by the weight-bias-ratio loss function according to the plurality of first convolutional kernels and the plurality of biases.

For example, the value of $L_{L1}$ may represent the weight-bias-ratio (L1) loss value of the parameters of the first convolutional neural network 10, and the loss value of the neural network includes the L1 loss value.

For example, the step S50 may include adjusting a ratio between the plurality of first convolutional kernels and the plurality of biases according to the weight-bias-ratio loss value. In the process of modifying the parameters of the first convolutional neural network 10, the L1 loss value needs to be adjusted repeatedly, so as to make W as small as possible and B as large as possible.

For example, W could be expressed as:

$$W = \frac{\sum \|w\|}{C_w}$$

where $C_w$ is the number of first convolutional kernels possessed by the first convolutional layer, w represents a value of each convolutional kernel of the first convolutional layer. For example, a convolutional kernel is a matrix of 2×2, and w denotes a sum of respective elements of the matrix.

For example, B could be expressed as:

$$B = \frac{\sum \|b\|}{C_b}$$

where $C_b$ is the number of biases possessed by the first convolutional layer, and b represents a value of each bias of the first convolutional layer.

For example, in an embodiment of the present disclosure, an activation function in the first convolutional neural network 10 can adopt a ReLU function. However, the present disclosure is not limited to this, the activation function in the first convolutional neural network 10 can also adopt a sigmoid function, a tanh function or the like.

For example, the ReLU function can be expressed as the following formula (2):

$$\text{out} = \begin{cases} \text{in}_1, & \text{in}_1 > 0 \\ 0, & \text{in}_1 < 0 \end{cases} \quad (2)$$

where out represents an output of the ReLU function, and $\text{in}_1$ represents an input of the ReLU function. In a convolutional neural network, $\text{in}_1$ can be expressed as the following formula (3):

$$\text{in}_1 = w \cdot \text{in}_0 + b \quad (3)$$

For example, in the formula (3), $\text{in}_0$ represents a pixel matrix of a first training input image that is input to, for example, a first convolutional layer C11, and $\text{in}_1$ represents a pixel matrix of a feature image that is output by the first convolutional layer C11 after processing $\text{in}_0$, w represents values of convolutional kernels in the first convolutional layer C11, and b represents values of biases in the first convolutional layer C11. From the above formulas (2) and (3), it can be seen that when b is large enough, the activation function can play an activation role more effectively, that is, the output of the activation function can represent the feature information of the first image better.

For example, the first pooling layer may be a down-sampling layer of the first convolutional neural network 10, and is used to reduce values of respective dimensions of a feature image, thereby reducing the data amount of the feature image. The composite layer is an up-sampling layer of the first convolutional neural network 10, and is used to increase the values of respective dimensions of the feature image, thereby increasing the data amount of the feature image.

For example, the first pooling layer can use various down-sampling methods to down-sample a feature image. The down-sampling methods include, but are not limited to: a maximum merging method, an average merging method, a random merging method, an under-sampling method (decimation, for example, selecting fixed pixels), a demultiplexing output method (demuxout, for splitting an input image into a plurality of smaller images), and so on.

For example, the composite layer can use interpolation algorithm or the like to achieve up-sampling. The interpolation algorithm may include, for example, an interpolation algorithm, a Bicubic Interprolation algorithm, and so on.

Figure 6A:
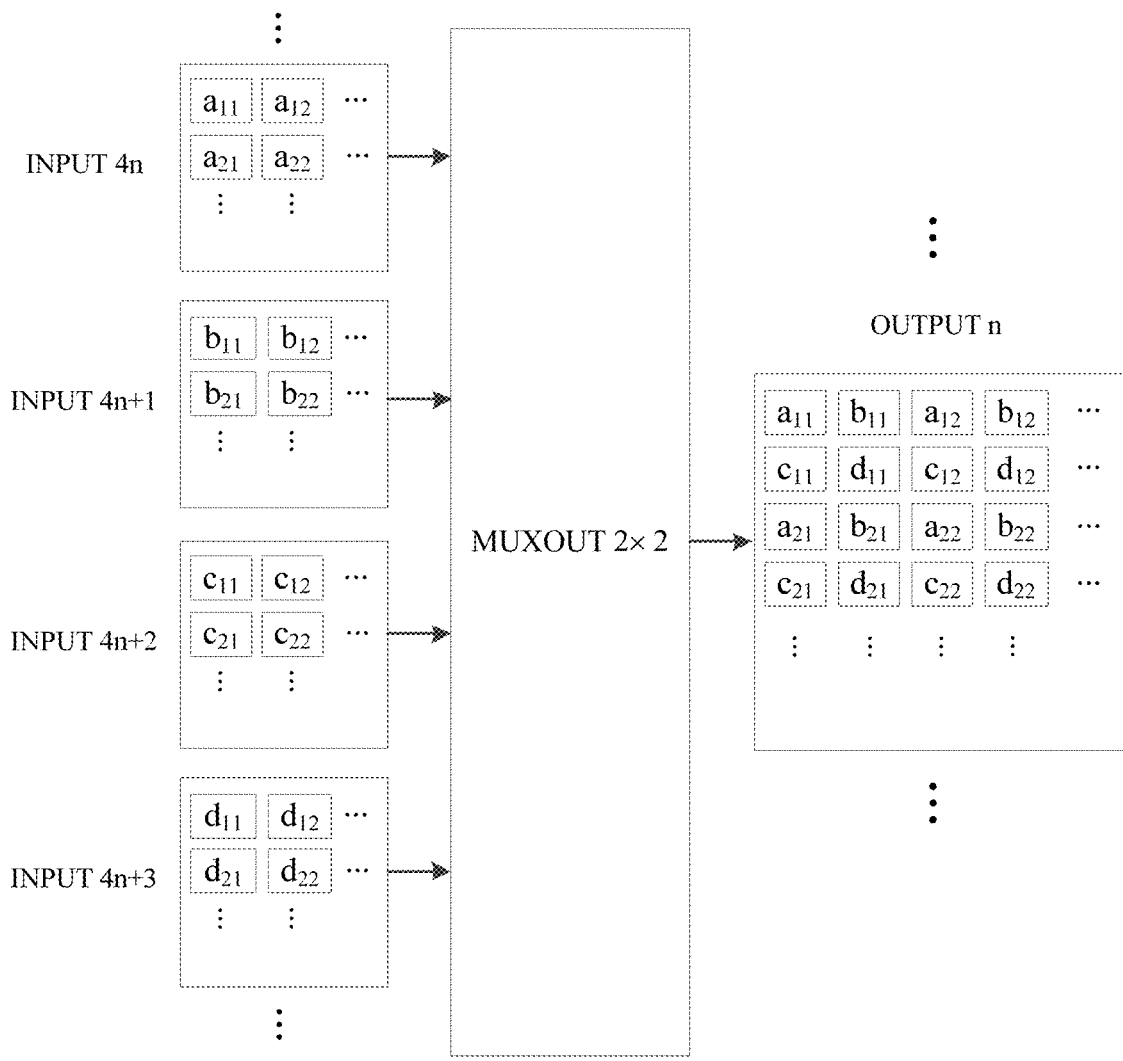
FIG. 6A is a schematic diagram of a composite layer provided by an embodiment of the present disclosure.
Figure 6B:
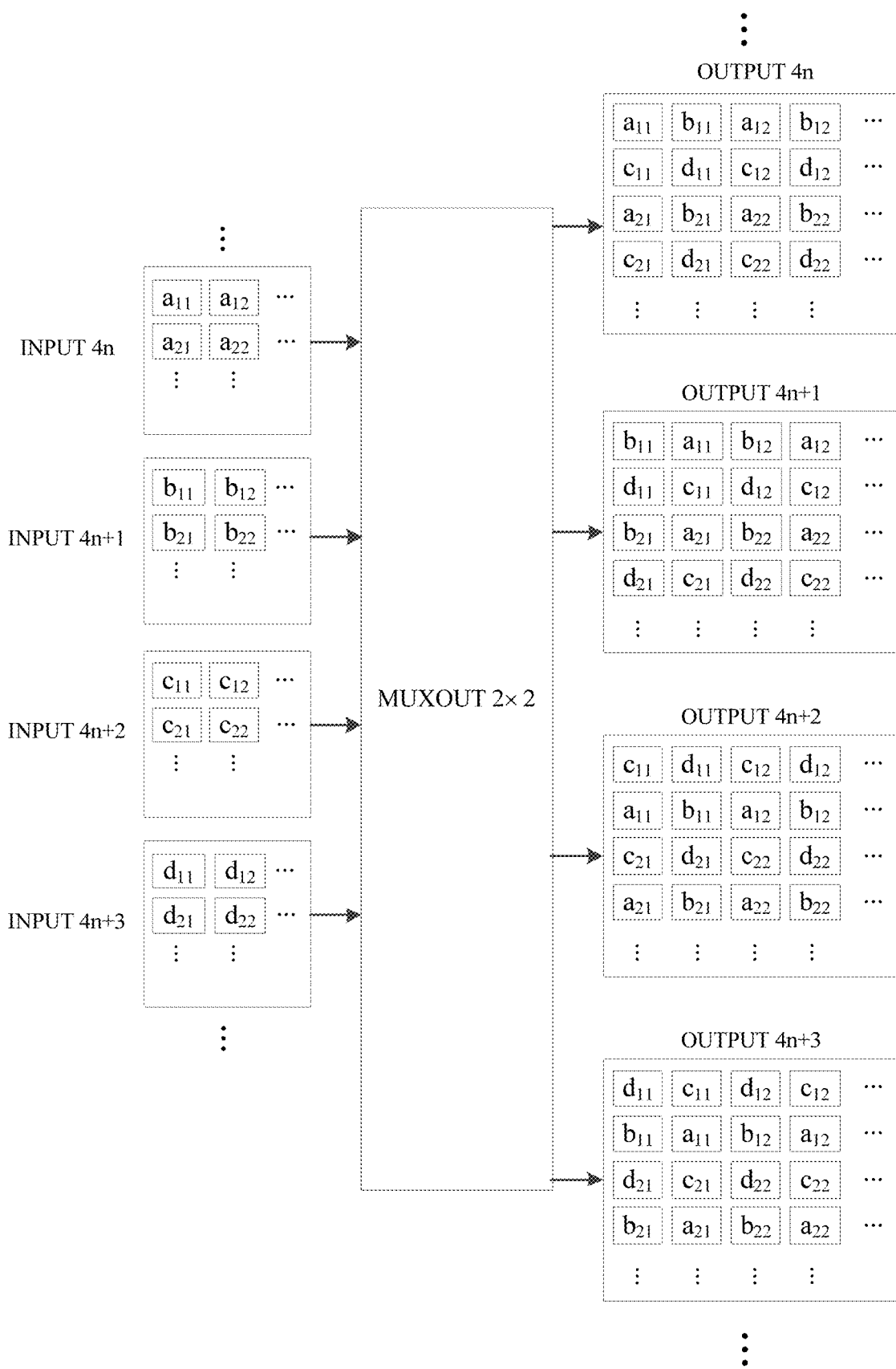
FIG. 6B is a schematic diagram of another composite layer provided by an embodiment of the present disclosure.

FIG. 6A is a schematic diagram of a composite layer provided by an embodiment of the present disclosure, and FIG. 6B is a schematic diagram of another composite layer provided by an embodiment of the present disclosure.

For example, in the example shown in FIG. 6A, the composite layer adopts a pixel difference method to implement the up-sampling. An up-sampling factor of 2×2 is used in the composite layer, so that four input feature images (i.e., INPUT 4n, INPUT 4n+1, INPUT 4n+2, INPUT 4n+3 in FIG. 6A) can be combined to obtain one output feature image (i.e., OUTPUT n in FIG. 6A) with a fixed pixel order.

For example, for a two-dimensional feature image, a composite layer in the first sub-network 101 acquires a first number of input feature images that are input, and interleaves and rearranges pixel values of these input feature images so as to generate the same first number of output feature images. Compared with the input feature images, the number of the output feature images is not changed, but a size of each of the output feature images is increased by a corresponding multiple. As a result, more data information is added through the composite layer adopting various permutations and combinations, and these combinations can give all possible up-sampling combinations. Finally, the selection can be made from the up-sampling combinations by an activation layer.

For example, in the example shown in FIG. 6B, a composite layer adopts a pixel value interleaved rearrangement method to achieve the up-sampling. The composite layer also uses an up-sampling factor of 2×2, that is, every four input feature images (i.e., INPUT 4n, INPUT 4n+1, INPUT 4n+2, INPUT 4n+3 in FIG. 6B) are taken as a group, and their pixel values are interleaved to generate four output feature images (i.e., OUTPUT 4n, OUTPUT 4n+1, OUTPUT 4n+2, OUTPUT 4n+3 in FIG. 6B). The number of input feature images is the same as the number of output feature images obtained after processing the input feature images by the composite layer, while a size of each output feature image is increased to be four times that of an input feature image, that is, the output feature image has a pixel number that is four times that of an input feature image.

For example, the first sub-network 101 further includes a plurality of instance normalization layers, the second sub-network 102 further includes a plurality of instance normalization layers, and the third sub-network 103 further includes a plurality of instance normalization layers. For example, as shown in FIG. 5A, the first sub-network 101 includes an instance normalization layer N11, an instance normalization layer N12 and an instance normalization layer N1$n_1$, the second sub-network 102 includes an instance normalization layer N21, an instance normalization layer N22 and an instance normalization layer N2$n_1$; and the third sub-network 103 includes the instance normalization layer N31, the instance normalization layer N32 and the instance normalization layer N3$n_1$. That is, the first sub-network 101 may include $n_1$ instance normalization layers, the second sub-network 102 also includes $n_1$ instance normalization layers, and the third sub-network 103 also includes $n_1$ instance normalization layers.

For example, as shown in FIG. 5A, the first sub-network 101 may include $n_1$ instance normalization layers, i.e. the instance normalization layers are in one-to-one correspondence to the first convolutional layers. But the present disclosure is not limited to this, several first convolutional layers (e.g., two or three first convolutional layers, etc.) may also correspond to one instance normalization layer, thus the number of instance normalization layers is less than that of the first convolutional layers. The embodiments of the present disclosure do not specifically limit this.

For example, as shown in FIG. 5B, in the second sub-network 102', the first standard down-sampling SD1 layer may further replace an initial instance normalization layer, and the first standard up-sampling layer SU1 may further replace a last instance normalization layer. Similarly, in the third sub-network 103', the second standard down-sampling SD2 and the second standard up-sampling layer SU2 may also replace instance normalization layers.

For example, the instance normalization layer is used to normalize a feature image output from a first convolutional layer, so that gray values of pixels of the feature image changes within a predetermined range, thereby simplifying generation and improving the quality of style transfer. For example, the predetermined range may be [−1, 1]. The instance normalization layer normalizes a feature image according to the mean value and variance of each feature image itself. The instance normalization layer can be used to standardize a single image.

For example, assuming that a size of a mini-batch gradient descent method is T, a quantity of feature images output from a first convolutional layer (e.g. the first convolutional layer C11 or the first convolutional layer C12 shown in FIG. 5A) is C, and each feature image is a matrix of H rows and W columns, then a model of the feature image is represented as (T, C, W, H). Thus, a standardized formula for the instance normalization layer can be expressed as follows:

$$y_{tijk} = \frac{x_{tijk} - \mu_{ti}}{\sqrt{\sigma_{ti}^2 + \varepsilon}}, \quad \mu_{ti} = \frac{1}{HW}\sum_{l=1}^{W}\sum_{m=1}^{H} x_{tilm}, \quad \sigma_{ti}^2 = \frac{1}{HW}\sum_{l=1}^{W}\sum_{m=1}^{H}(x_{tilm} - m\mu_{ti})^2$$

where $x_{tijk}$ is a value of a j-th column and a k-th row of an i-th feature image in a t-th feature patch among a feature image set outputted from a first convolutional layer. $y_{tijk}$ represents a result obtained after $x_{tijk}$ is processed by the instance normalization layer. $\varepsilon$ is a very small integer, so as to avoid the denominator being 0.

It should be noted that, the embodiments of the present disclosure do not limit the number of respective layers in the first convolutional neural network 10.

For example, as shown in FIG. 4B, the analysis network may include a second convolutional neural network 20. The second convolutional neural network 20 is configured to receive the first training input image, the second training input image and the training output image, and to respectively generate and output a first training input feature of the first training input image, a first training output feature and a second training output feature of the training output image and a second training input feature of the second training input image.

For example, the second training input image is a style image. The second training input image, for example, may be a famous painting of various art masters (such as Monet, Van Gogh, Picasso, etc.). However the present disclosure is not limited to this, for example, the second training input image may also be an ink-and-wash painting, a sketch, etc.

For example, the training output image is an image formed after the first convolutional neural network 10 performs a style transfer on the first training input image. The training output image includes content features of the first training input image and style features of the second training input image.

For example, the first training input image, the second training input image and the training output image all have the same size.

For example, both the first training input feature and the first training output feature are content features, and both the second training input feature and the second training output feature are style features. For example, the content features denote the distribution of objects in the image over the whole image, while the style features denote the relationship between different feature images in different layers of the convolutional neural network. For example, the content features include the content information of an image, and the style features may include the texture information of the image, the color information of the image, and so on. The texture information, for example, represents the correlation among feature images, and is independent of location. A feature image in the convolutional neural network may be a one-dimensional matrix, and A Gram matrix may be used to measure the correlation degree of respective vectors in the one-dimensional matrix. Therefore, the Gram matrix can be introduced into the convolutional neural network, and is used for calculating style features of the image. For example, the Gram matrix could be expressed as follows:

$$G_{ij}^l = \sum_k F_{ik}^l F_{jk}^l$$

where $G_{ij}^l$ is an inner product between a vector feature image i and a vector feature image j in a l-th layer. According to the correlation among feature images of a plurality of layers, a static multi-scale expression of the second image or the third image can be obtained, therefore instead of the global layout, the texture information of the second image or the third image is extracted, thereby obtaining the style features.

Figure 7:
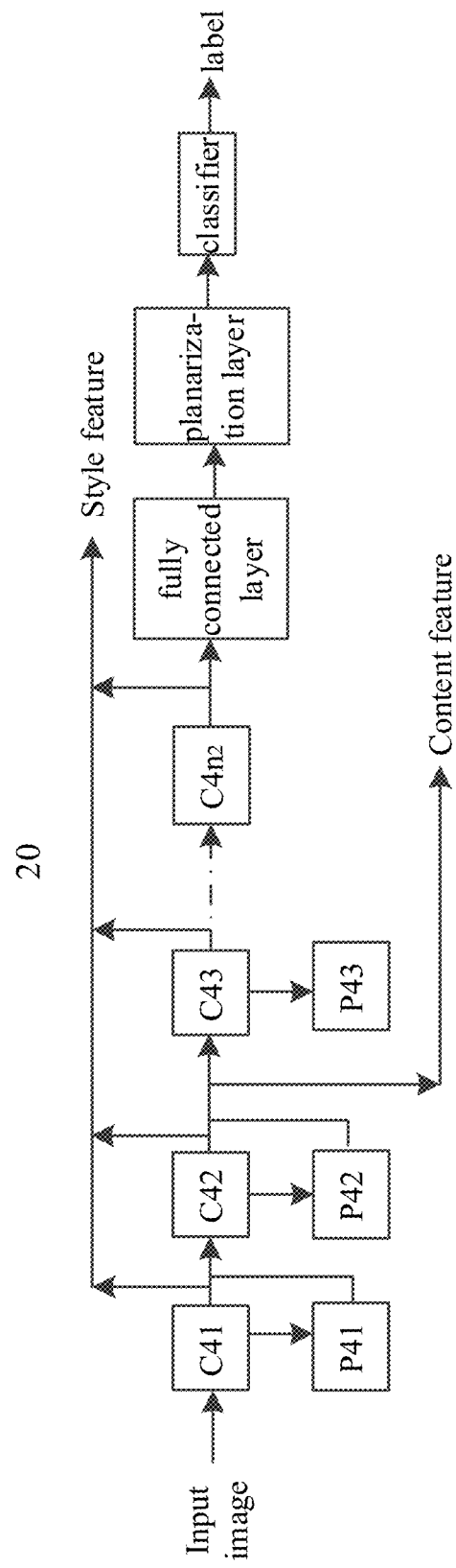
FIG. 7 is a schematic structural view of a second convolutional neural network provided by an embodiment of the present disclosure.

FIG. 7 is a schematic structural view of a second convolutional neural network provided by an embodiment of the present disclosure. For example, as shown in FIG. 7, the second convolutional neural network 20 includes a plurality of second convolutional layers (e.g., a second convolutional layer C41, a second convolutional layer C42, a second convolutional layer C43, and a second convolutional layer C4$n_2$) sequentially connected and a plurality of second pooling layers (e.g., a second pooling layer P41, a second pooling layer P42, and a second pooling layer P43) interposed between adjacent second convolutional layers. Each of the second convolutional layers is used for extracting and outputting a first training input feature, a first training output feature, a second training output feature and/or a second training input feature. As shown in FIG. 7, the second convolutional neural network 20 includes $n_2$ second convolutional layers and $n_2$ second pooling layers, where $n_2$ is a positive integer.

For example, each of the second convolutional layers includes a plurality of second convolutional kernels. The second convolutional kernels can be used to extract content features and/or style features of an input image. For example, the input image shown in FIG. 7 may be the first training input image, the second training input image and the training output image.

For example, the second convolutional neural network 20 may employ a convolutional neural network model that has been trained. Thus, in the embodiments of the present disclosure, parameters (e.g., second convolutional kernels, etc.) of the second convolutional neural network 20 need not to be trained and modified. For example, the second convolutional neural network 20 may adopt AlexNet, GoogleNet, VGG, Deep Residual Learning or other neural network models to implement extraction of the content features and the style features of the input image. VGG neural network is a kind of deep convolutional neural network, is developed by a Visual Geometry Group of Oxford University, and has been widely used in the field of visual recognition. For example, the VGG network may include 19 layers, and some of them may be normalized.

For example, the second convolutional neural network 20 may employ a deep neural network capable of classifying images. As shown in FIG. 7, an input image is processed by a plurality of second convolutional layers and a plurality of second pooling layers, so that features are extracted. An output of each of the second convolutional layers is a feature image of the input image. The second pooling layer can reduce the resolution of the feature image and pass the feature image to a second convolutional layer of the next level. A plurality of second convolutional layers may output a plurality of feature images, and the plurality of feature images can characterize features of different levels of the input image (e.g. textures, edges, objects, etc.). After the feature image is processed by the plurality of second convolutional layers and the plurality of second pooling layers, the feature image is input to a planarization layer, the planarization layer converts the feature image into a vector and passes the vector to a fully connected layer and a classifier. The classifier layer may include a softmax classifier, and the softmax classifier may output the probabilities that the input image belongs to respective category labels, a label with the greatest probability will be a final output of the second convolutional neural network 20. Thus, the second convolutional neural network 20 implements the image classification.

For example, in the second convolutional neural network 20, a l-th second convolutional layer has $N_l$ second convolutional kernels, the l-th second convolutional layer is used for generating and outputting $N_l$ first training feature images of the first training input image, $N_l$ second training feature images and $N_l$ third training feature images of the training output image, and $N_l$ fourth training feature images of the second training input image, and the $N_l$ second convolutional kernels are in one-to-one correspondence to the $N_l$ first training feature images, to the $N_l$ second training feature images, to the $N_l$ third training feature images and to the $N_l$ fourth training feature images, respectively. That is, one second convolutional kernel is used to generate and output one first training feature image, one second training feature image, one third training feature image or one fourth training feature image. If the $N_l$ second convolutional kernels are different from each other, then the $N_l$ first training feature images are different from each other, the $N_l$ second training feature images are different from each other, the $N_l$ third training feature images are different from each other, and the $N_l$ fourth training feature images are also different from each other.

For example, l is a positive integer. l represents a label of a second convolutional layer in the second convolutional neural network 20. For example, as shown in FIG. 7, the second convolutional neural network 20 has n2 second convolutional layers, and then a value range of l is [1, n2]. In the example shown in FIG. 7, where the content features are extracted, l is 2; where the style features are extracted, l may be 1, 2, 3 and $n_2$. But the present disclosure is not limited to this, and according to the actual application requirements, l can also be other values.

For example, the $N_1$ first training feature images, the $N_1$ second training feature images, the $N_1$ third training feature images and the $N_1$ fourth training feature images all have the same size.

For example, the first training feature images and the third training feature images are content feature images, and the second training feature images and the fourth training feature images are style feature images. That is, some second convolutional layers in the second convolution neural network 20 may be used to extract content features of the first training input image so as to obtain the first training feature images, other second convolutional layers in the second convolutional neural network 20 are used to extract style features and content features of the training output image so as to obtain the second training feature images and the third training feature images, respectively, still some other second convolutional layers in the second convolutional neural network 20 are further used to extract style features of the second training input image so as to obtain the fourth training feature images. For example, second convolutional layers for extracting content features of the first training input image and second convolutional layers for extracting content features of the training output image may be the same, and may also be different; second convolutional layer for extracting style features of the training output image and second convolutional layers for extracting style features of the second training input image may be the same, and may also be different. For another example, second convolutional layers for extracting content features and second convolutional layers for style features may be the same, and may also be different.

For example, correspondingly, the loss function 30 may further include a content loss function and a style loss function. The content loss function is used to describe the difference in content between the first training input image and the training output image, and the style loss function is used to describe the difference in style between the second training input image and the training output image.

For example, the content loss function is used to calculate, based on the first training input feature of the first training input image and the first training output feature of the training output image, a content loss value of the parameters of the first convolutional neural network 10. The style loss function is used to calculate, based on the second training output feature of the training output image and the second training input feature of the second training input image, a style loss value of the parameters of the first convolutional neural network 10.

For example, in some examples, the step S40 may further include extracting a first training input feature of the first training input image and extracting a first training output feature of the training output image by an analysis network; and according to the first training input feature and the first training output feature, calculating the content loss value of the parameters of the neural network by the content loss function. For example, the loss value of neural network also includes the content loss value.

For example, the step S50 may further include adjusting values of the plurality of first convolutional kernels and values of the plurality of biases according to the content loss value.

For example, in some examples, the step S40 may further include extracting a second training input feature of the second training input image and a second training output feature of the training output image by the analysis network; according to the second training output feature and the second training input feature, calculating the style loss value of the parameters of the neural network by the style loss function. For example, the loss value of neural network includes the style loss value.

For example, the step S50 may further include adjusting the values of the plurality of first convolutional kernels and the values of the plurality of biases according to style loss value.

For example, a content loss function of the l-th convolutional layer is expressed as a formula (4):

$$C_l = \frac{1}{2 \cdot S_1} \sum_{ij} (F_{ij}^l - P_{ij}^l)^2 \qquad (4)$$

where $C_l$ represents the content loss function, $F_{ij}^l$ represents a value of a j-th position in a first training feature image corresponding to an i-th second convolutional kernel in the l-th second convolutional layer, $P_{ij}^l$ represents a value of a j-th position in a third training feature image corresponding to the i-th second convolutional kernel in the l-th second convolutional layer, and $S_1$ is a constant.

For example, as shown in FIG. 7, if the content features of the input image (for example, here, the input image includes the first training input image and the training output image) are extracted by Q1 second convolutional layers, and then a total content loss function is expressed as a formula (5):

$$L_{content} = \sum_{l=0}^{Q1} w_{1l} \cdot C_l \qquad (5)$$

where $L_{content}$ represents the total content loss function, Q1 is a positive integer, and denotes the number of second convolutional layers for extracting and outputting the first training input feature and the first training output feature, and $w_{1l}$ represents a weight of $C_l$.

For example, a style loss function of the l-th second convolutional layer is expressed as a formula (6):

$$E_l = \frac{1}{4 \cdot N_l^2 \cdot M_l^2 \cdot S_2} \sum_{i,j} (G_{ij}^l - A_{ij}^l)^2 \qquad (6)$$

where $E_l$ represents the style loss function, $M_l$ represents a size of the fourth training feature image, $A_{ij}^l$ represents a value of a j-th position in a Gram matrix of a second training feature image corresponding to the i-th second convolutional kernel in the l-th second convolutional layer, $G_{ij}^l$ represents a value of a j-th position in a Gram matrix of a fourth training feature image corresponding to the i-th second convolutional kernel in the l-th second convolutional layer, and $S_2$ is a constant.

It should be noted that, the size of the second training feature image is the same as the size of the fourth training feature image, and therefore, $M_l$ also represents the size of the second training feature image.

For example, as shown in FIG. 7, if the style features of the input image (for example, here, the input image includes the second training input image and the training output image) are extracted by Q2 second convolutional layers, and then a total style loss function is expressed as a formula (7):

$$L_{style} = \sum_{l=0}^{Q2} w_{2l} \cdot E_l \quad (7)$$

where $L_{style}$ represents the total style loss function, Q2 is a positive integer, and denotes the number of second convolutional layers for extracting and outputting the second training input feature and the second training output feature, and $w_{2l}$ denotes a weight of $E_l$.

For example, Q1 and Q2 may be the same, and may also be different.

For example, the style features may be extracted by a plurality of second convolutional layers (e.g., two or three second convolutional layers, etc.), while the content features may be extracted by one second convolutional layer. But the present disclosure is not limited thereto, the style features may also be extracted by one second convolutional layer. The content features may also be extracted by a plurality of second convolutional layers. The embodiments of the present disclosure do not specifically limit this.

For example, based on formula (1), formula (5) and formula (7), a total loss function $L_{total}$ of the neural network may be expressed as follows:

$$L_{total} \alpha \cdot L_{content} + \beta \cdot L_{style} + \chi \cdot L_{L1}$$

where $\alpha, \beta, \chi$ respectively are weights of the content loss function, the style loss function and the L1 loss function in the total loss function.

For example, the loss value of the parameters of the first convolutional neural network 10 includes the L1 loss value, the content loss value and the style loss value. That is to say, a value of $L_{total}$ represents the loss value of the parameters of the first convolutional neural network 10.

For example, as shown in FIG. 4B, the neural network may include a first conversion matrix 50 and a second conversion matrix 51. The first training input image has a first training input color channel, a second training input color channel and a third training input color channel. The step S20 may include converting the first training input image into a first training intermediate image by the first conversion matrix; and inputting the first training intermediate image to the neural network.

For example, converting the first training input image into the first training intermediate image by the first conversion matrix includes: converting, by the first conversion matrix, data information of the first training input color channel, data information of the second training input color channel and data information of the third training input color channel of the first training input image into data information of a first training luminance channel, data information of a first training color difference channel and data information of a second training color difference channel of the first training intermediate image.

For example, in one example, as shown in FIG. 5A, the step S30 may include: performing the style transfer process on the data information of the first training luminance channel of the first training intermediate image, the data information of the first training color difference channel of the first training intermediate image, and the data information of the second training color difference channel of the first training intermediate image by using the first sub-network 101, the second sub-network 102 and the third sub-network 103 respectively, so as to generate data information of a second training luminance channel of a second training intermediate image, data information of a third training color difference channel of the second training intermediate image, and data information of a fourth training color difference channel of the second training intermediate image; and converting the second training intermediate image into the training output image.

For example, in one example, as shown in FIG. 5B, in the second sub-network 102', the first training input image is firstly down-sampled by a first standard down-sampling layer SD1, so as to reduce the amount of data information of the first training color difference channel of the first training intermediate image; next, the data information of the first training color difference channel is processed by a plurality of first convolutional layers; after that, the data information of the first training color difference channel is up-sampled by a first standard up-sampling layer SU1, so as to increase the amount of data information of the first training color difference channel; finally, the data information of the first training color difference channel is transmitted to the second conversion matrix 51. Similarly, the third sub-network 103' is used to process the data information of the second training color difference channel of the first training intermediate image.

For example, converting the second training intermediate image into the training output image includes: receiving and converting, by the second conversion matrix 51, the data information of the second training luminance channel, the data information of the third training color difference channel and the data information of the fourth training color difference channel of the second training intermediate image processed by the first convolutional neural network 10, so as to obtain data information of a first training output color channel of the training output image, data information of a second training output color channel of the training output image and data information of a third training output color channel of the training output image.

For example, the first training input image is an image in a RGB format, and the first training intermediate image is an image in a YUV format. The first training input color channel, the second training input color channel and the third training input color channel are a red (R) channel, a green (G) channel and a blue (B) channel, respectively. The first training luminance channel, the first training color difference channel and the second training color difference channel are a Y channel, a U channel and a V channel, respectively. In a YUV color space, the Y channel, the U channel and the V channel are separated from each other; Y represents brightness, U and V represents color difference, and U and V are two components constituting color.

For example, the training output image is an image in a RGB format, and the second training intermediate image is an image in a YUV format. The first training output color channel, the second training output color channel and the third training output color channel are a red (R) channel, a green (G) channel and a blue (B) channel, respectively. The second training luminance channel, the third training color difference channel and the fourth training color difference channel are a Y channel, a U channel and a V channel, respectively.

Figure 8:
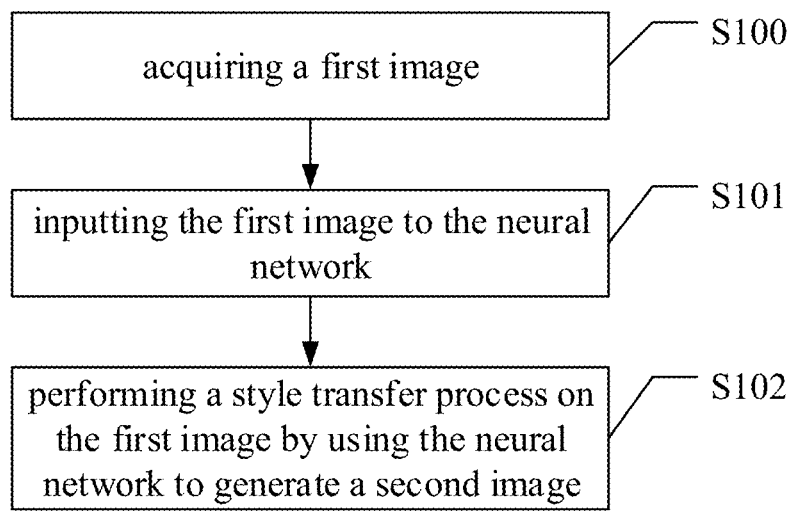
FIG. 8 is a schematic flowchart of an image processing method for implementing image style transfer based on a neural network, provided by an embodiment of the present disclosure.

FIG. 8 is a schematic flowchart of an image processing method for implementing image style transfer based on a neural network, provided by an embodiment of the present disclosure. The neural network is a neural network trained according to the training method provided by any one of the above embodiments.

For example, as shown in FIG. 8, the image processing method provided by an embodiment of the present disclosure may include the following steps:

step S100: acquiring a first image;

step S101: inputting the first image to the neural network;

Step S102: performing a style transfer process on the first image by using the neural network to generate a second image.

The image processing method provided by the embodiment of the present disclosure can perform a style transfer process on the first image by a neural network, so that not only a better style transfer effect can be achieved, but also the processing speed can be improved, thereby having a better and wider application prospect.

For example, in the step S100, the first image may be an image of various types. For example, the first image may be a person image, an animal or plant image, a landscape image, or the like.

For example, the first image may be obtained by an image acquisition device. The image acquisition device may be, for example, a camera of a smartphone, a camera of a tablet, a camera of a personal computer, a lens for a digital camera, or even a webcam.

For example, the second image is an image formed by performing style transfer on the first image through the first convolutional neural network. The second image includes content features of the first image and style features of a style image. After a neural network is trained, the style features are determined and unchanged. For example, in the process of training the neural network, a painting of Picasso (e.g., named as "Dream") is used as the style image for training, and then the style of the second image obtained by processing the first image by the trained neural network is the style of the Picasso's painting (named as "Dream"). It should be noted that, the style image may be the second training input image in an embodiment of the training method of the neural network.

Figure 9A:
FIG. 9A is a schematic diagram of a first image.
Figure 9B:
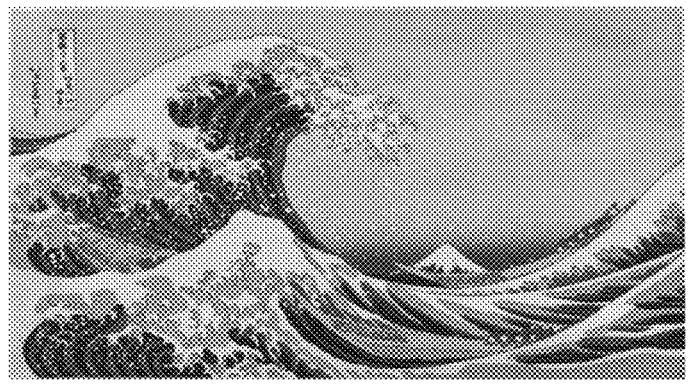
FIG. 9B is a schematic diagram of a style image.
Figure 9C:
FIG. 9C is a schematic diagram of a second image obtained through an image processing method provided by an embodiment of the present disclosure.

FIG. 9A is an exemplary diagram of a first image, FIG. 9B is a schematic diagram of a style image, and FIG. 9C is a schematic diagram of a second image obtained through an image processing method provided by an embodiment of the present disclosure. For example, as shown in FIG. 9A, the first image may be a photograph taken by a user. The style image may be an Ukiyo-e engraving, and for example, the picture shown in FIG. 9B is The Great Wave of Kanagawa. The image shown in FIG. 9C is a second image obtained by the image processing method provided in an embodiment of the present disclosure, and the second image has content features of the first image and style features of the style image.

For example, the first image and the second image may have the same resolution, and may also have different resolutions. For example, the first image and the second image are of the same size.

For example, the neural network further includes a first conversion matrix 50, and the first image has a first input color channel, a second input color channel, and a third input color channel. The step S101 may include: converting the first image into a first intermediate image by the first conversion matrix; and inputting the first intermediate image into the neural network.

For example, the first image is an image in a RGB format, and the first intermediate image is an image in a YUV format. The first input color channel, the second input color channel and the third input color channel are a red (R) channel, a green (G) channel and a blue (B) channel, respectively. The first luminance channel, the first color difference channel and the second color difference channel are a Y channel, a U channel and a V channel, respectively. In a YUV color space, the Y channel, the U channel and the V channel are separated from each other. Y represents brightness, U and V represent color difference, and U and V are two components constituting color.

For example, converting the first image to the first intermediate image by the first conversion matrix may include: converting, by the first conversion matrix, data information of the first input color channel of the first image, data information of the second input color channel of the first image and data information of the third input color channel of the first image into data information of a first luminance channel of the first intermediate image, data information of a first color difference channel of the first intermediate image and data information of a second color difference channel of the first intermediate image.

For example, a conversion formula for the first conversion matrix 50 may be expressed as:

$Y1=0.30R1+0.59G1+0.11B1$ $U1=0.493\cdot(0.70R1-0.59G1-0.11B1)$ $V1=0.877\cdot(-0.30R1-0.59G1-0.11B1)$ where Y1, U1 and V1 respectively represent luminance information, first chrominance information and second chrominance information of the first intermediate image, namely, Y1, U1 and V1 respectively represent data of the Y channel, data of the U channel and data of the V channel of the first intermediate image. R1, G1 and B1 respectively represent the red information, the green information and the blue information of the first image, that is, R1, G1 and B1 respectively represent the data of the R channel, the data of the G channel and the data of the B channel of the first image.

For example, the neural network includes a first convolutional neural network. The first convolutional neural network may include a first sub-network, a second sub-network and a third sub-network. The first sub-network is used for processing the data information of the Y channel, the second sub-network is used for processing the data information of the U channel, and the third sub-network is used for processing the data information of the V channel. That is to say, the image processing method provided by an embodiment of the present disclosure may separately process different channels of the first intermediate image, thereby reducing the model of generating neural network, further improving the processing speed, and increasing the flexibility of image processing.

For example, the first sub-network includes a first set of first convolutional layers, the second sub-network includes a second set of first convolutional layers, and the third sub-network includes a third set of first convolutional layers. The first sub-network 101 further includes a plurality of first pooling layers, a plurality of composite layers and a plurality of instance normalization layers, the second sub-network 102 further includes a plurality of first pooling layers, a plurality of composite layers and a plurality of instance normalization layers, and the third sub-network 103 further includes a plurality of first pooling layers, a plurality of composite layers, and a plurality of instance normalization layers. Some composite layers or instance normalization layers and the like may be omitted in the second sub-network or the third sub-network.

It should be noted that, for detailed descriptions of the specific structure of the first convolutional neural network, reference may be made to the descriptions of the first convolutional neural network in the embodiment of the training method of the neural network, and repetitions are omitted here.

For example, the YUV format may include YUV444, YUV420, YUV422 and other formats. The main difference among YUV444, YUV420, YUV422 and other formats is the sampling mode and storage mode of data of the U channel and the V channel.

Assume that, if four pixel points in an image are represented respectively as:
[Y0U0V0][Y1U1V1][Y2U2V2][Y3U3V3]
During image processing, a data stream for storing or processing the four pixel points is:
Y0U0V0 Y1U1V1 Y2U2V2 Y3U3V3
The mapped pixel points are represented respectively as:
[Y0U0V0][Y1U1V1][Y2U2V2][Y3U3V3]
That is, the mapped pixel points are original pixel points.

For example, the YUV420 format indicates that only one kind of chromaticity information (first chromaticity information U or second chrominance information V) is in each row of pixels, and the first chromaticity information U or the second chrominance information V is sampled and stored at a frequency of ½. During image processing, different chromaticity information of adjacent rows is processed.

Supposing that eight pixel points in two rows in an image are represented respectively as:
[Y0U0V0][Y1U1V1][Y2U2V2][Y3U3V3]
[Y4U4V4][Y5U5V5][Y6U6V6][Y7U7V7]
During image processing, a data stream for storing or processing the eight pixel points is:

| Y0U0 | Y1 | Y2U2 | Y3 |
| Y4V4 | Y5 | Y6V6 | Y7 |

In a first row of pixels, there is only the first chromaticity information U; in a second row of pixels, there is only the second chromaticity information V.

The mapped pixel points are represented as:
[Y0 U0 V4][Y1 U0 V4][Y2 U2 V6][Y3 U2 V6]
[Y4 U0 V4][Y5 U0 V4][Y6U2 V7][Y7 U2 V6]

In summary, four adjacent pixel points in each row merely occupy 6 bytes when stored or processed, and as compared with the sampling mode of YUV444 (which requires 12 bytes for 4 pixel points), the data amount of the processed and stored pixel points is reduced in the YUV420 format. Although the mapped pixel points are slightly different from the original pixel points, these differences do not cause significant changes in the perception of human eyes.

Figure 10A:
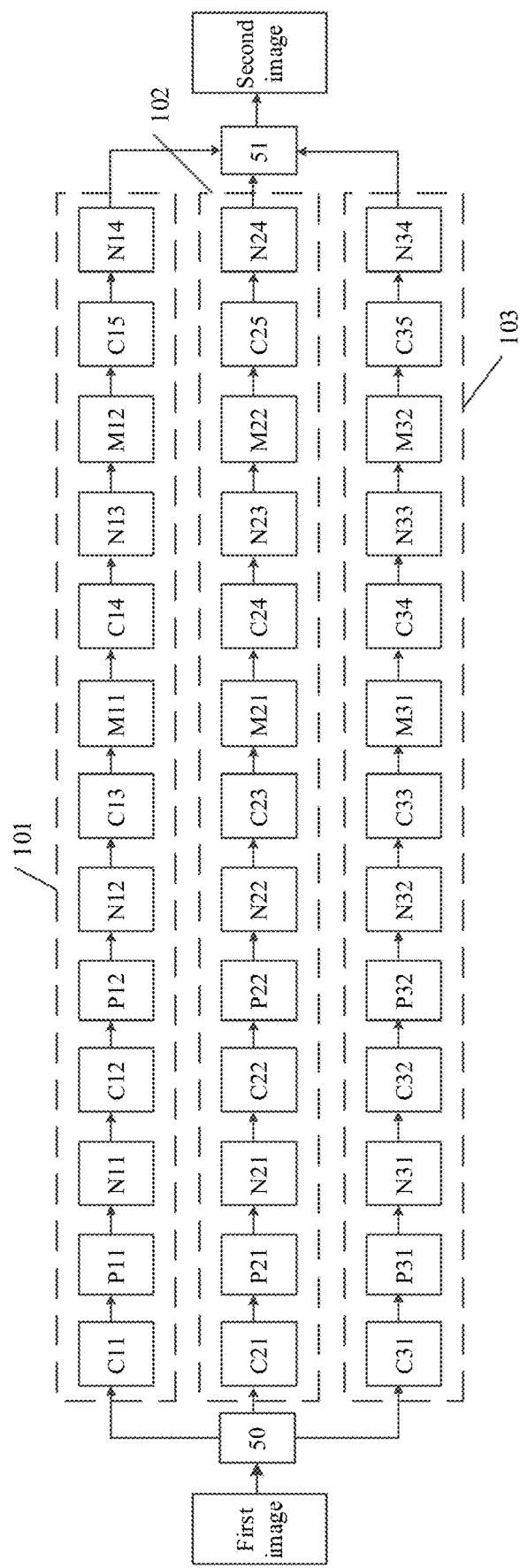
FIG. 10A is a schematic structural diagram of a generating neural network provided by an embodiment of the present disclosure.
Figure 10B:
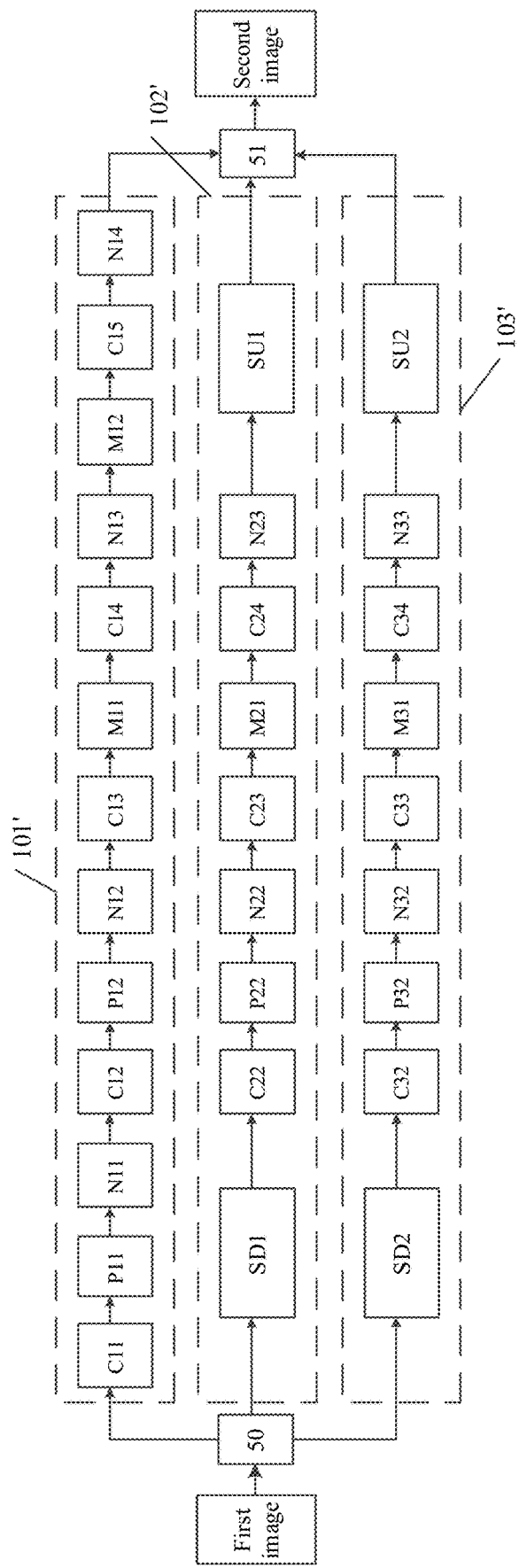
FIG. 10B is a schematic structural diagram of another generating neural network provided by an embodiment of the present disclosure.

FIG. 10A is a schematic structural diagram of a neural network provided by an embodiment of the present disclosure; and FIG. 10B is a schematic structural diagram of another neural network provided by an embodiment of the present disclosure.

For example, in a first example, the first intermediate image is in an image format of YUV 444. The structures of a first sub-network, a second sub-network and a third sub-network may be the same, and may also be different.

For example, as shown in FIG. 10A, in the first example, a first sub-network 101, a second sub-network 102 and a third sub-network 103 have the same structure. Descriptions will be given below by taking the first sub-network 101 as an example. For example, the first sub-network 101 includes five first convolutional layers (a first convolutional layer C11, a first convolutional layer C12, a first convolutional layer C13, a first convolutional layer C14 and a first convolutional layer C15), two first pooling layers (a first pooling layer P11 and a first pooling layer P12), two composite layers (a composite layer M11 and a composite layer M12) and four instance normalization layers (an instance normalization layer N11, an instance normalization layer N12, an instance normalization layer N13 and an instance normalization layer N14).

For example, in the first example, as shown in FIG. 10A, the step S102 may include: performing the style transfer processing on the first luminance channel, the first color difference channel and the second color difference channel of the first intermediate image by using the first sub-network, the second sub-network and the third sub-network, respectively, so as to generate a second intermediate image, the second intermediate image comprising data information of a second luminance channel, data information of a third color difference channel and data information of a fourth color difference channel; and converting the second intermediate image into the second image.

For example, in a second example, the first intermediate image is in an image format of YUV 420. In the step of converting the first image into the first intermediate image by a first conversion matrix, the first image may be processed on the YUV color space so that the first intermediate image is in the image format of YUV420. Therefore, the size of U channel and the size of V channel are reduced, and furthermore, the number of convolutional kernels in the generating neural network is reduced.

For example, in the second example, the second sub-network includes a first standard up-sampling layer and a first standard down-sampling layer. The first standard down-sampling layer is used to replace an initial first convolutional layer, an initial first pooling layer, and an initial instance normalization layer of the second set of first convolutional layers in the second sub-network of the first convolutional neural network. The first standard up-sampling layer is used to replace a last first convolutional layer, a last composite layer and a last instance normalization layer of the second set of first convolutional layers in the second sub-network of the first convolutional neural network. The third sub-network includes a second standard up-sampling layer and a second standard down-sampling layer. The second standard down-sampling layer is used to replace an initial first convolutional layer, an initial first pooling layer and an initial instance normalization layer of the third set of first convolutional layers in the third sub-network of the first convolutional neural network. The second standard up-sampling layer is used to replace a last first convolutional layer, a last composite layer and a last instance normalization layer of the third set of first convolutional layers in the third sub-network of the first convolutional neural network.

For example, as shown in FIG. 10B, in the second example, a first sub-network 101' may be identical in structure to the first sub-network 101 in the first example.

For example, as shown in FIG. 10B, the second sub-network 102' and the third sub-network 103' have the same structure. Descriptions will be given below by taking the second sub-network 102' as an example. For example, the second sub-network 102' includes one first standard down-sampling layer SD1, one first standard up-sampling layer SU1, three first convolutional layers (a first convolutional layer C22, a first convolutional layer C23 and a first convolutional layer C24), one first pooling layer (a first pooling layer P22), one composite layer (a composite layer M21) and two instance normalization layers (an instance normalization layer N22 and an instance normalization layer N23).

For example, as compared with the first example, in the second example, the first standard down-sampling layer SD1 replaces the initial first convolutional layer, the initial first pooling layer, and the initial instance normalization layer, and the first standard up-sampling layer SU1 replaces the last first convolutional layer, the last first pooling layer and the last instance normalization layer. As a result, the network model size of the neural network is reduced.

For example, as shown in FIGS. 10A and 10B, in the second sub-network 102', the first standard down-sampling layer SD1 replaces the initial first convolutional layer C21, the initial first pooling layer P21 and the initial instance normalization layer N21; and the first standard up-sampling layer SU1 replaces the last first convolutional layer C25, the last composite layer M22 and the last instance normalization layer N24.

For example, a first convolutional layer for processing the highest resolution of the U channel is omitted in the second sub-network 102', and a first convolutional layer for processing the highest resolution of the V channel is omitted in the third sub-network 103'. Thus, the image processing method can further increases the image processing speed.

For example, the first standard down-sampling layer SD1 and the first standard up-sampling layer SU1 are respectively used for down-sampling and up-sampling the data information of U channel. The second standard down-sampling layer SD2 and the second standard up-sampling layer SU2 are respectively used for down-sampling and up-sampling the data information of V channel.

For example, the structures and sampling factors of the first standard down-sampling layer SD1 and the second standard down-sampling layer SD2 may be the same or different. The structures and sampling factors of the first standard up-sampling layer SU1 and the second standard up-sampling layer SU2 may be the same or different. There are no specific limitations on this.

For example, if the first intermediate image is in the image format of YUV 420, the structures and down-sampling factors of the first standard down-sampling layer SD1 and the second standard down-sampling layer SD2 are the same, the structures and up-sampling factors of the first standard up-sampling layer SU1 and the second standard up-sampling layer SU2 are also the same. Thus, the second sub-network 102' and the third sub-network 103' have the same structure.

For example, in the second example, as shown in FIG. 10B, the step S102 includes: processing a first luminance channel, a first color difference channel and a second color difference channel of the first intermediate image by using the first sub-network 101', the second sub-network 102' and the third sub-network 103' respectively, so as to generate a second intermediate image, the second intermediate image including data information of a second luminance channel, data information of a third color difference channel and data information of a fourth color difference channel; and converting the second intermediate image into a second image.

For example, the second image is an image in a RGB format, and the second intermediate image is an image in a YUV format. Similarly, the first output color channel, the second output color channel and the third output color channel are a red (R) channel, a green (G) channel and a blue (B) channel, respectively. The second luminance channel, the third color difference channel and the fourth color difference channel are a Y channel, a U channel and a V channel, respectively.

For example, as shown in FIGS. 10A and 10B, the neural network may further include a second conversion matrix 51. Converting the second intermediate image into the second image includes: converting, by the second conversion matrix, the data information of the second luminance channel of the second intermediate image, the data information of the third color difference channel of the second intermediate image and the data information of the fourth color difference channel of the second intermediate image into data information of a first output color channel of the second image, data information of a second output color channel of the second image and data information of a third output color channel of the second image. In the operation of converting the second intermediate image into the second image, a conversion formula of the second conversion matrix 51 may be expressed as follows:

$$\begin{bmatrix} R2 \\ G2 \\ B2 \end{bmatrix} = \begin{bmatrix} 1 & 0 & 1.13983 \\ 1 & -0.39465 & -0.58060 \\ 1 & 2.03211 & 0 \end{bmatrix} \cdot \begin{bmatrix} Y2 \\ U2 \\ V2 \end{bmatrix}$$

where Y2, U2 and V2 respectively represent brightness information (i.e. the data information of the second luminance channel), first chromaticity information (i.e. the data information of the third color difference channel) and second chrominance information (i.e. the data information conversion of the fourth color difference channel) of the second intermediate image; and R2, G2 and B2 respectively represent red information (i.e., the data information of the first output color channel), green information (i.e. the data information of the second output color channel) and blue information (i.e. the data information of the third output color channel) of the second image.

For example, the second intermediate image is an image obtained after the first intermediate image is processed by the neural network. If the neural network includes an instance normalization layer, then a range of gray values of pixels of the second intermediate image is [−1, 1], and when performing the operation of converting the second intermediate image into the second image, the method further includes: converting the data information of the Y channel, the data information of the U channel and the data information of the V channel of the second intermediate image into data information of the R channel, data information of the G channel and data information of the B channel of the second image; and converting the gray values of the pixels of the second image to be within a range of [0, 255].

For example, as shown in FIGS. 10A and 10B, the neural network may not include a planarization layer, a fully connected layer, and a classifier.

It should be noted that, for a specific process of performing the style transfer processing on the first image by the neural network, reference may be made to related descriptions of performing a processing on the first training input image by the neural network in an embodiment of the training method described above. Repetitions are not described herein again.

Figure 11:
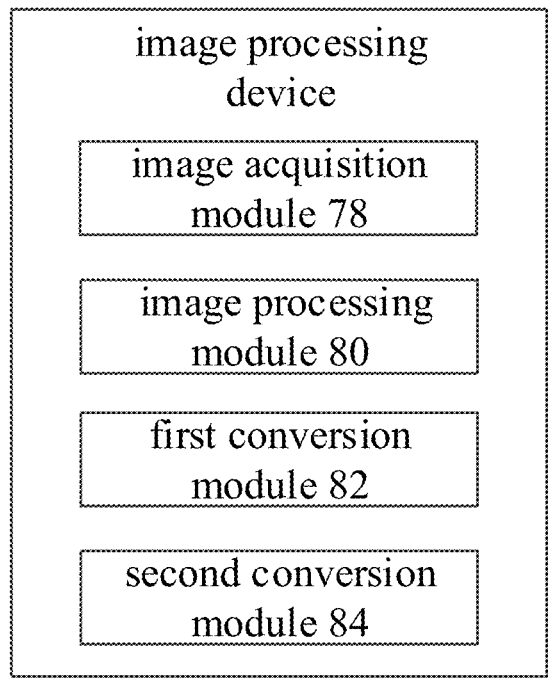
FIG. 11 is a schematic block diagram of an image processing device provided by an embodiment of the present disclosure.

FIG. 11 is an exemplary block diagram of an image processing device provided by an embodiment of the present disclosure. For example, as shown in FIG. 11, the image processing device provided in an embodiment of the present disclosure includes an image acquisition module 78 and an image processing module 80. The image acquisition module 78 is configured to acquire a first image, and the image processing module 80 is configured to perform a style transfer process on the first image, so as to generate a second image.

For example, the image processing module 80 may include the neural network that is obtained by training according to the training method as described in any one of the above embodiments.

The image processing device provided by an embodiment of the disclosure performs a style transfer process on the first image through the neural network, so as to improve effects of the image style transfer and image fusion, and the processing effect, the processing speed and other aspects are all taken into account at the same time, thereby having a better and wider application prospect.

For example, the image acquisition module 78 may include a memory that stores the first image. Alternatively, the image acquisition module 78 may also include one or more cameras, so as to obtain the first image. For example, the image acquisition module 705 may be hardware, software, firmware, and any feasible combination thereof.

For example, as shown in FIG. 11, the image processing device further includes a first conversion module 82. The first conversion module 82 includes a first conversion matrix 50 in the neural network in an embodiment of the image processing method as described above. The first conversion matrix 50 is used to convert the first image into a first intermediate image.

For example, the first image has a first input color channel, a second input color channel and a third input color channel, and the first intermediate image has a first luminance channel, a first color difference channel and a second color difference channel. The first conversion matrix 50 may be used to convert data information of the first input color channel, data information of the second input color channel and data information of the third input color channel of the first image into data information of the first luminance channel, data information of the first color difference channel and data information of the second color difference channel of the first intermediate image.

For example, the neural network may include a first convolutional neural network, and the first convolutional neural network may include a first sub-network, a second sub-network, and a third sub-network. The first sub-network, the second sub-network and the third sub-network are respectively used for processing the first luminance channel, the first color difference channel and the second color difference channel of the first intermediate image, so as to generate data information of a second luminance channel of a second intermediate image, data information of a third color difference channel of the second intermediate image and data information of a fourth color difference channel of the second intermediate image.

For example, the first sub-network includes a first set of first convolutional layers, the second sub-network includes a second set of first convolutional layers, and the third sub-network includes a third set of first convolutional layers. The second sub-network includes a first standard up-sampling layer and a first standard down-sampling layer, and the third sub-network includes a second standard up-sampling layer and a second standard down-sampling layer. The first standard down-sampling layer is used to replace the initial first convolutional layer in the second set of first convolutional layers of the second sub-network, and the first standard up-sampling layer is used to replace the last first convolutional layer in the second set of first convolutional layers of the second sub-network. The second standard down-sampling layer is used to replace the initial first convolutional layers in the third set of first convolutional layers of the third sub-network, and the second standard up-sampling layer is used to replace the last first convolutional layer in the third set of first convolutional layers of the third sub-network.

For example, as shown in FIG. 11, the image processing device further includes a second conversion module 84. The second conversion module 84 includes a second conversion matrix 51 in the neural network described above. The second conversion matrix 51 may be used to convert the second intermediate image into a second image. Specifically, the second conversion module 84 is used to convert data information of a second luminance channel, data information of a third color difference channel and data information of a fourth color difference channel of the second intermediate image into data information of a first output color channel of the second image, data information of a second output color channel of the second image and data information of a third output color channel of the second image.

For example, as shown in FIGS. 10A and 10B, the first conversion matrix 50 is used for receiving the first image, and converting the first image into the first intermediate image. The first intermediate image outputted from the first conversion matrix 50 is input into the image processing module 80. The image processing module 80 is used to perform a style transfer process on the first intermediate image, so as to generate the second intermediate image. The second conversion matrix 51 is used for receiving the second intermediate image outputted from the image processing module 80, and converting the second intermediate image into the second image and then outputting the second image. The second image is used as a final output of the image processing device. The second image has content features of the first image and style features of another image (e.g., an oil painting of a master of art, etc.).

It should be noted that, for detailed descriptions of the first image, the first intermediate image, the second intermediate image, the second image, the neural network, conversion formulas of the first conversion matrix 50 and the second conversion matrix 51, and so on, reference may be made to the relevant descriptions in the embodiment of the image processing method, and repeated description will be omitted here.

Figure 12:
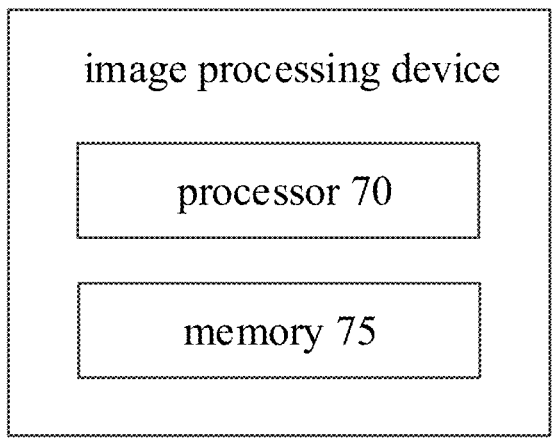
FIG. 12 is a schematic block diagram of another image processing device provided by an embodiment of the present disclosure.

FIG. 12 is a schematic block diagram of another image processing device provided by an embodiment of the present disclosure. At least one embodiment of the present disclosure provides an image processing device, as shown in FIG. 12, the image processing device includes a processor 70 and a memory 75. It should be noted that the components of the image processing device shown in FIG. 12 are merely exemplary and are not limited, and according to actual application needs, the image processing device can also have other components.

For example, the processor 70 and the memory 75 can be communicated with each other directly or indirectly.

For example, the processor 70, the memory 75 and other components may be connected and communicated with each other through a network. The network may comprise a wireless network, a wired network, and/or any combination of the wireless network and the wired network. The network may comprise a local area network, the Internet, a telecommunication network, Internet of things based on the Internet and/or the telecommunication network, and/or any combination of the above networks, and the like. For example, the wired network may communicate by means such as a twisted pair, coaxial cable or optical fiber transmission. The wireless network may communicate by means such as 3G/4G/5G mobile communication networks, Bluetooth, Zigbee or WiFi. The present disclosure does not limit types and functions of the network herein.

For example, the processor 70 may control other components in the image processing device to perform a desired function. The processor 70 may be a central processing unit (CPU), a tensor processing unit (TPU), a graphics processing unit (GPU), or other forms of device having data processing capabilities and/or program execution capabilities. For example, the central processing unit (CPU) may be an X86, ARM architecture, or the like. The GPU can be separately and directly integrated into a motherboard, or may be built into a north bridge chip of the motherboard. The GPU can also be built into the central processing unit (CPU).

For example, the memory 75 may comprise an arbitrary combination of one or more computer program products. The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, an erasable programmable read only memory (EPROM), a portable compact disc-read only memory (CD-ROM), a USB memory, a flash memory, and the like.

For example, one or more computer instructions may be stored on the memory 75, and the processor 70 can execute the computer instructions, so as to achieve various functions. A variety of application programs and various data, such as style images, various data used and/or generated by the application programs and so on, may also be stored in a computer-readable storage medium.

For example, when some computer instructions stored in the memory 75 are executed by the processor 70, one or more steps in the image processing method as described above can be performed. For another example, when other computer instructions stored in the memory 75 are executed by the processor 70, one or more steps in the training method of the neural network as described above can be performed.

For example, for detailed descriptions of the processing procedure of the image processing method, reference may be made to the relevant descriptions in an embodiment of the image processing method as described above, and for the detailed descriptions of the processing procedure of the training method of the neural network, reference may be made to the relevant descriptions in an embodiment of the training method of the neural network as mentioned above, and repetitions are omitted here.

At least one embodiment of the present disclosure further provides a storage medium. For example, one or more computer instructions may be stored on the storage medium. Some computer instructions stored on the storage medium may be, for example, instructions for implementing one or more steps of the above described image processing method. Some other computer instructions stored on the storage medium may be, for example, instructions for implementing one or more steps of the above described training method of the neural network.

For the present disclosure, the following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A training method of a neural network for implementing image style transfer, comprising:

acquiring a first training input image and a second training input image;
inputting the first training input image to the neural network;
performing a style transfer process on the first training input image by using the neural network, so as to obtain a training output image;
based on the first training input image, the second training input image and the training output image, calculating a loss value of parameters of the neural network through a loss function; and
modifying the parameters of the neural network according to the loss value, in a case where the loss function satisfies a predetermined condition, obtaining a trained neural network, and in a case where the loss function does not satisfy the predetermined condition, continuing to input the first training input image and the second training input image so as to repeatedly perform the above training process,
wherein the loss function comprises a weight-bias-ratio loss function.

2. The training method according to claim 1, wherein the neural network comprises a first convolutional neural network, the first convolutional neural network comprises a plurality of first convolutional kernels and a plurality of biases, and the parameters of the neural network comprise the plurality of first convolutional kernels and the plurality of biases,
the weight-bias-ratio loss function is expressed as:

$$L_{L1} = \frac{W}{B+\varepsilon}.$$

where $L_{L1}$ represents the weight-bias-ratio loss function, W is an average value of absolute values of the plurality of first convolutional kernels, B is an average value of absolute values of the plurality of biases, and $\varepsilon$ is a positive number.

3. The training method according to claim 2, wherein calculating the loss value of the parameters of the neural network through the loss function comprises:
calculating a weight-bias-ratio loss value of the parameters of the neural network by the weight-bias-ratio loss function according to the plurality of first convolutional kernels and the plurality of biases, and
the loss value comprises the weight-bias-ratio loss value.

4. The training method according to claim 3, wherein modifying the parameters of the neural network according to the loss value comprises:
adjusting a ratio between the plurality of first convolutional kernels and the plurality of biases according to the weight-bias-ratio loss value.

5. The training method according to wherein the neural network further comprises a first conversion matrix, the first training input image has a first training input color channel, a second training input color channel and a third training input color channel,
inputting the first training input image to the neural network comprises:
converting the first training input image into a first training intermediate image by the first conversion matrix; and
inputting the first training intermediate image to the neural network;

wherein converting the first training input image into the first training intermediate image by the first conversion matrix comprises:
converting, by the first conversion matrix, data information of the first training input color channel, data information of the second training input color channel and data information of the third training input color channel of the first training input image into data information of a first training luminance channel, data information of a first training color difference channel and data information of a second training color difference channel of the first training intermediate image.

6. The training method according to claim 5, wherein the first convolutional neural network comprises a first sub-network, a second sub-network and a third sub-network, performing the style transfer process on the first training input image by using the neural network so as to obtain the training output image comprises:
performing the style transfer process on the data information of the first training luminance channel of the first training intermediate image, the data information of the first training color difference channel of the first training intermediate image, and the data information of the second training color difference channel of the first training intermediate image by using the first sub-network, the second sub-network and the third sub-network respectively, so as to generate data information of a second training luminance channel of a second training intermediate image, data information of a third training color difference channel of the second training intermediate image, and data information of a fourth training color difference channel of the second training intermediate image;
converting the second training intermediate image into the training output image,
wherein the training output image is an image in a RGB format, and the second training intermediate image is an image in a YUV format.

7. The training method according to claim 6, wherein the neural network further comprises a second conversion matrix,
converting the second training intermediate image into the training output image comprises:
converting, by the second conversion matrix, the data information of the second training luminance channel of the second training intermediate image, the data information of the third training color difference channel of the second training intermediate image and the data information of the fourth training color difference channel of the second training intermediate image into data information of a first training output color channel of the training output image, data information of a second training output color channel of the training output image and data information of a third training output color channel of the training output image.

8. The training method according to claim 2, wherein the loss function further comprises a content loss function,
calculating the loss value of the parameters of the neural network through the loss function based on the first training input image, the second training input image and the training output image further comprises:
extracting a first training input feature of the first training input image and extracting a first training output feature of the training output image by an analysis network; and
calculating a content loss value of the parameters of the neural network by the content loss function, according to the first training input feature and the first training output feature, and
the loss value comprises the content loss value;
wherein the loss function further comprises a style loss function,
calculating the loss value of the parameters of the neural network through the loss function based on the first training input image, the second training input image and the training output image further comprises:
extracting a second training input feature of the second training input image and extracting a second training output feature of the training output image by the analysis network; and
calculating a style loss value of the parameters of the neural network by the style loss function, according to the second training input feature and the second training output feature, and
the loss value comprises the style loss value.

9. The training method according to claim 8, wherein both the first training input feature and the first training output feature are content features, and both the second training input feature and the second training output feature are style features.

10. The training method according to claim 8, wherein the analysis network comprises a second convolutional neural network, the second convolutional neural network comprises a plurality of second convolutional layers sequentially connected and a plurality of second pooling layers interposed between adjacent second convolutional layers, each of the plurality of second convolutional layers is used for extracting the first training input feature, the first training output feature, the second training output feature and/or the second training input feature,
a l-th second convolutional layer has $N_l$ second convolutional kernels, the l-th second convolutional layer is used for generating and outputting $N_l$ first training feature images of the first training input image, $N_l$ second training feature images and $N_l$ third training feature images of the training output image, and $N_l$ fourth training feature images of the second training input image, and the $N_l$ second convolutional kernels are in one-to-one correspondence to the $N_l$ first training feature images, to the $N_l$ second training feature images, to the $N_l$ third training feature images and to the $N_l$ fourth training feature images, respectively,
the $N_l$ first training feature images, the $N_l$ second training feature images, the $N_l$ third training feature images and the $N_l$ fourth training feature images have same size.

11. The training method according to claim 10, wherein a content loss function of the l-th second convolutional layer is expressed as:

$$C_l = \frac{1}{2 \cdot S_1} \sum_{ij} (F_{ij}^l - P_{ij}^l)^2$$

where $C_l$ represents the content loss function, $F_{ij}^l$ denotes a value of a j-th position in a first training feature image corresponding to an i-th second convolutional kernel of the l-th second convolutional layer, $P_{ij}^l$ denotes a value of a j-th position in a third training feature image corresponding to the i-th second convolutional kernel of the l-th second convolutional layer, $S_1$ is a constant, a total content loss function is expressed as:

$$L_{content} = \sum_{l=0}^{Q1} w_{1l} \cdot C_l$$

where $L_{content}$ represents the total content loss function, Q1 is a positive integer, and denotes a number of second convolutional layers for extracting and outputting the first training input feature and the first training output feature, and $w_{1l}$ represents a weight of the $C_1$;
a style loss function of the l-th second convolutional layer is expressed as:

$$E_l = \frac{1}{4 \cdot N_l^2 \cdot M_l^2 \cdot S_2} \sum_{i,j} (G_{ij}^l - A_{ij}^l)^2$$

where $E_l$ represents the style loss function, $M_l$ represents a size of a fourth training feature image, $A_{ij}^l$ denotes a value of a j-th position in a Gram matrix of a second training feature image corresponding to the i-th second convolutional kernel of the l-th second convolutional layer, $G_{ij}^l$ denotes a value of a j-th position in a Gram matrix of a fourth training feature image corresponding to the i-th second convolutional kernel of the l-th second convolutional layer, $S_2$ is a constant,
a total style loss function is expressed as:

$$L_{style} = \sum_{l=0}^{Q2} w_{2l} \cdot E_l$$

where $L_{style}$ represents the total style loss function, Q2 is a positive integer, and denotes a number of second convolutional layers for extracting and outputting the second training input feature and the second training output feature, and $w_{2l}$ represents a weight of the $E_l$.

12. An image processing method for implementing image style transfer based on a neural network, wherein the neural network is a neural network obtained by training according to the training method according to claim 1,
the image processing method comprises:
acquiring a first image;
inputting the first image to the neural network; and
performing a style transfer process on the first image by using the neural network to generate a second image.

13. The image processing method according to claim 12, wherein the neural network further comprises a first conversion matrix, and the first image has a first input color channel, a second input color channel and a third input color channel,
inputting the first image to the neural network comprises:
converting the first image into a first intermediate image by the first conversion matrix; and
inputting the first intermediate image into the neural network;
wherein converting the first image into the first intermediate image by the first conversion matrix comprises:
converting, by the first conversion matrix, data information of the first input color channel of the first image, data information of the second input color channel of the first image and data information of the third input color channel of the first image into data information of a first luminance channel of the first intermediate image, data information of a first color difference channel of the first intermediate image and data information of a second color difference channel of the first intermediate image.

14. The image processing method according to claim 13, wherein the neural network further comprises a first convolutional neural network, the first convolutional neural network comprises a first sub-network, a second sub-network and a third sub-network,
performing a style transfer process on the first image by using the neural network to generate a second image comprises:
performing the style transfer processing on the data information of the first luminance channel of the first intermediate image, the data information of the first color difference channel of the first intermediate image and the data information of the second color difference channel of the first intermediate image by using the first sub-network, the second sub-network and the third sub-network, respectively, so as to generate data information of a second luminance channel of a second intermediate image, data information of a third color difference channel of the second intermediate image and data information of a fourth color difference channel of the second intermediate image;
converting the second intermediate image into the second image,
wherein the second image is an image in a RGB format, and the second intermediate image is an image in a YUV format.

15. The image processing method according to claim 14, wherein the neural network further comprises a second conversion matrix,
converting the second intermediate image into the second image comprises:
converting, by the second conversion matrix, the data information of the second luminance channel of the second intermediate image, the data information of the third color difference channel of the second intermediate image and the data information of the fourth color difference channel of the second intermediate image into data information of a first output color channel of the second image, data information of a second output color channel of the second image and data information of a third output color channel of the second image.

16. An image processing device, comprising:
an image acquisition module, configured to acquire a first image;
an image processing module, comprising a neural network obtained by training according to the training method according to claim 1, the image processing module being used for performing a style transfer process on the first image by using the neural network to generate a second image.

17. The image processing device according to claim 16, further comprising a first conversion module,
wherein the first image has a first input color channel, a second input color channel and a third input color channel,
the first conversion module is used for converting data information of the first input color channel of the first image, data information of the second input color channel of the first image and data information of the third input color channel of the first image into data information of a first luminance channel of a first intermediate image, data information of a first color difference channel of the first intermediate image, and data information of a second color difference channel of the first intermediate image, the neural network comprises a first sub-network, a second sub-network and a third sub-network, the first sub-network, the second sub-network and the third sub-network are respectively used for processing the data information of the first luminance channel of the first intermediate image, the data information of the first color difference channel of the first intermediate image, and the data information of the second color difference channel of the first intermediate image, so as to generate data information of a second luminance channel of a second intermediate image, data information of a third color difference channel of the second intermediate image, and data information of a fourth color difference channel of the second intermediate image.

18. The image processing device according to claim 17, further comprising a second conversion module, wherein the second conversion module is used to convert the data information of the second luminance channel of the second intermediate image, the data information of the third color difference channel of the second intermediate image, and the data information of the fourth color difference channel of the second intermediate image into data information of a first output color channel of the second image, data information of a second output color channel of the second image and data information of a third output color channel of the second image.

19. The image processing device according to claim 17, wherein the first sub-network comprises a first set of first convolutional layers, the second sub-network comprises a second set of first convolutional layers, and the third sub-network comprises a third set of first convolutional layers;

the second sub-network comprises a first standard up-sampling layer and a first standard down-sampling layer, and the third sub-network comprises a second standard up-sampling layer and a second standard down-sampling layer;

the first standard down-sampling layer is used to replace an initial first convolutional layer in the second set of first convolutional layers of the second sub-network, the first standard up-sampling layer is used to replace a last first convolutional layer in the second set of first convolutional layers of the second sub-network;

the second standard down-sampling layer is used to replace an initial first convolutional layer in the third set of first convolutional layers of the third sub-network, the second standard up-sampling layer is used to replace a last first convolutional layer in the third set of first convolutional layers of the third sub-network.

20. An image processing device, comprising:
a memory, for storing non-temporary computer-readable instructions; and
a processor, for executing the computer-readable instructions, the training method according to claim 1 being performed while the computer-readable instructions are executed by the processor.

\* \* \* \* \*

UNITED STATES PATENT AND TRADEMARK OFFICE
CERTIFICATE OF CORRECTION

PATENT NO. : 11,461,639 B2
APPLICATION NO. : 16/336995
DATED : October 4, 2022
INVENTOR(S) : Hanwen Liu et al.

Page 1 of 1

It is certified that error appears in the above-identified patent and that said Letters Patent is hereby corrected as shown below:

In the Claims

Column 36, Claim 5, Line 56:
"The training method according to wherein…"

Should be:
"The training method according to claim 2, wherein…"

Signed and Sealed this
Fourth Day of April, 2023

Katherine Kelly Vidal
*Director of the United States Patent and Trademark Office*